US012753970B2

(12) United States Patent
Im et al.

(10) Patent No.: US 12,753,970 B2
(45) Date of Patent: Oct. 6, 2026

(54) SUBSTRATE TREATING APPARATUS

(71) Applicant: SEMES CO., LTD., Chungcheongnam-do (KR)

(72) Inventors: Yong Joon Im, Gyeonggi-do (KR); Sang Min Lee, Seoul (KR); Jong Doo Lee, Chungcheongnam-do (KR); Jin Se Park, Incheon (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 970 days.

(21) Appl. No.: 17/825,275

(22) Filed: May 26, 2022

(65) Prior Publication Data

US 2022/0381509 A1 Dec. 1, 2022

(30) Foreign Application Priority Data

May 31, 2021 (KR) ........................ 10-2021-0070010

(51) Int. Cl.
*F26B 5/00* (2006.01)

(52) U.S. Cl.
CPC .................................... *F26B 5/005* (2013.01)

(58) Field of Classification Search
CPC ....................................................... F26B 5/005
USPC .............................................................. 34/68
See application file for complete search history.

(56) References Cited

U.S. PATENT DOCUMENTS 4,009,734 A * 3/1977 Sullivan .................. B29C 53/12 138/125
9,003,674 B2 4/2015 Nakashima et al.
9,076,643 B2 7/2015 Toshima et al.
10,157,690 B2 12/2018 Kitamura
2007/0222686 A1* 9/2007 Carscallen ............. H02G 11/00 29/601
2011/0000507 A1* 1/2011 Toshima ........... H01L 21/02101 134/61
2017/0018322 A1* 1/2017 Kitamura ................ G21F 9/002
2019/0221455 A1* 7/2019 Seo ........................... F27B 5/14

FOREIGN PATENT DOCUMENTS

CN 102937388 A 2/2013
CN 106457318 A 2/2017
JP 2001-77071 A 3/2001
JP 2008-311603 A 12/2008
JP 2010-60244 A 3/2010

(Continued)

OTHER PUBLICATIONS

English Translation of KR 10-1329304 B1 (Year: 2013).*

(Continued)

*Primary Examiner* — Connor J Tremarche
(74) *Attorney, Agent, or Firm* — Carter, DeLuca & Farrell LLP

(57) ABSTRACT

The present invention provides a substrate treating apparatus, including: a housing including a first body and a second body which are combined with each other to provide a treatment space in which a substrate is treated; an actuator which moves the second body in a vertical direction with respect to the first body to seal or open the treatment space; and a pipe which is coupled with the second body and in which a fluid flows, in which the pipe is a stretchable pipe that is stretchable and contractible according to the vertical movement of the second body.

15 Claims, 10 Drawing Sheets

(56) References Cited

FOREIGN PATENT DOCUMENTS

| | | | | | |
|---|---|---|---|---|---|
| JP | 2010-161165 | A | | 7/2010 | |
| JP | 4559532 | B2 | | 10/2010 | |
| JP | 2013-4662 | A | | 1/2013 | |
| JP | 2013-33962 | A | | 2/2013 | |
| JP | 2015043442 | A | | 3/2015 | |
| KR | 1995-0000403 | Y1 | | 1/1995 | |
| KR | 10-2001-0052640 | A | | 6/2001 | |
| KR | 100797082 | B1 | * | 1/2008 | ....... H01L 21/67051 |
| KR | 10-2010-0081925 | A | | 7/2010 | |
| KR | 101329304 | B1 | * | 11/2013 | |
| KR | 10-2319449 | B1 | | 11/2021 | |

OTHER PUBLICATIONS

English Translation of KR100797082 B1 (Year: 2008).*
Request for the Submission of an Opinion by the Korean Intellectual Property Office on Nov. 30, 2022 in corresponding KR Patent Application No. 10-2021-0070010, with English Translation.
Chinese Office Action issued by the China National Intellectual Property Administration on Jul. 26, 2025 in corresponding CN Patent Application No. 202210613432.4, with English translation.
Notice of Reasons for Refusal issued by the Japanese Patent Office on Jun. 13, 2023 in corresponding JP Patent Application No. 2022-077298, with English translation.

* cited by examiner

SUBSTRATE TREATING APPARATUS

CROSS-REFERENCE TO RELATED APPLICATIONS

This application claims priority to and the benefit of Korean Patent Application No. 10-2021-0070010 filed in the Korean Intellectual Property Office on May 31, 2021, the entire contents of which are incorporated herein by reference.

TECHNICAL FIELD

The present invention relates to an apparatus for treating a substrate, and more particularly, to a substrate treating apparatus performing a drying process on a substrate.

BACKGROUND ART

In general, in order to manufacture a semiconductor device, various processes, such as a photo process, an etching process, an ion implantation process, and a deposition process, are performed. Further, in the process of performing these processes, various foreign substances, such as particles, organic contaminants, and metal impurities, are generated. These foreign substances cause defects in the substrate and act as factors that directly affect the performance and yield of semiconductor devices. A cleaning process for removing these foreign substances is essential in the manufacturing process of semiconductor devices.

In a general cleaning process, the substrate is treated with chemicals and a rinse solution, followed by drying. As an example of the drying process, there is a rotation drying process in which a substrate is rotated at a high speed to remove a rinse solution remaining on the substrate. However, since the rotation drying method uses centrifugal force, it may cause a leaning phenomenon in the pattern formed on the substrate.

Accordingly, recently, a supercritical drying process in which an organic solvent, such as isoprophyl alcohol (IPA), is supplied on the substrate to replace the rinse solution remaining on the substrate with an organic solvent having low surface tension, and then the organic solvent remaining on the substrate is removed by supplying a treatment fluid in a supercritical state onto the substrate, is used.

FIG. 1 is a cross-sectional diagram schematically illustrating a general substrate treating apparatus which dries a substrate by using a supercritical fluid. Referring to FIG. 1, a substrate treating apparatus 5000 includes a first body 5100 and a second body 5200 which are combined with each other to provide a treatment space in which a supercritical drying treatment is performed therein. The second body 5200 is connected with a pipe 5400 in which a supercritical fluid flows.

The supercritical drying process includes a substrate loading process of loading a substrate W into the treatment space, a pressurizing process of pressurizing an atmosphere in the treatment space, a decompression process of returning the atmosphere within the treatment space to normal pressure, and a substrate unloading process of unloading the substrate W from the treatment space. In the substrate loading process, the second body 5200 moves up toward the first body 5100 by an actuator 5300 in order to load the substrate W into the treatment space. In the substrate unloading process, the second body 5200 moves down by the actuator 5300 in order to unload the substrate W from the treatment space.

In the supercritical drying treatment process, the second body 5200 moves in up and down directions. In general, the pipe 5400 provided in the supercritical drying process is connected with various devices (for example, a valve, a heater, a pressure sensor, and a tank) and a position of the pipe 5400 is fixed. When the second body 5200 moves up and down, the pipe 5400 connected to the second body 5200 is provided in the state where the position thereof is fixed, so that there occurs a problem in which the pipe 5400 connected with the second body 5200 is damaged or the pipe 5400 is transformed.

SUMMARY OF THE INVENTION

The present invention has been made in an effort to provide a substrate treating apparatus, in which when a supercritical drying treatment is performed on a substrate, a pipe in which a supercritical fluid flows is stretched and contracted according to vertical movement of a housing.

The present invention has also been made in an effort to provide a substrate treating apparatus which is capable of preventing a pipe in which a supercritical fluid flows from being damaged when a supercritical drying treatment is performed on a substrate.

The present invention has also been made in an effort to provide a substrate treating apparatus which is capable of preventing backflow due to condensation of a supercritical fluid inside a pipe that discharges the supercritical fluid from a treatment space when a supercritical drying treatment is performed on a substrate.

The object of the present invention is not limited thereto, and other objects not mentioned will be clearly understood by those of ordinary skill in the art from the following description.

An exemplary embodiment of the present invention provides a substrate treating apparatus, including: a housing including a first body and a second body which are combined with each other to provide a treatment space in which a substrate is treated; an actuator which moves the second body in a vertical direction with respect to the first body to seal or open the treatment space; and a pipe which is coupled with the second body and in which a fluid flows, in which the pipe is a stretchable pipe that is stretchable and contractible according to the vertical movement of the second body.

According to the exemplary embodiment, the stretchable pipe may be provided as a coil pipe.

According to the exemplary embodiment, the pipe may include a discharge pipe discharging the fluid from the treatment space, and an upper end of the coil pipe may be located upstream of the discharge pipe than the lower end of the coil pipe.

According to the exemplary embodiment, the coil pipe may be provided to be compressed when the second body moves in a down direction.

According to the exemplary embodiment, the discharge pipe may further include: a first discharge pipe connected to a downstream side of the coil pipe; and a second discharge pipe which connects the coil pipe and the second body at the upstream side of the coil pipe, and a height of the first discharge pipe may be fixed when the second body vertically moves, and the second discharge pipe may be provided to be vertically moved along with the vertical movement of the second body when the second body vertically moves.

According to the exemplary embodiment, the pipe may include a supply pipe supplying the fluid to the treatment space, and an upper end of the coil pipe may be located upstream of the supply pipe than a lower end of the coil pipe.

According to the exemplary embodiment, the coil pipe may be provided to be tensioned when the second body moves in a down direction.

According to the exemplary embodiment, the supply pipe may further include: a first supply pipe connected to an upstream side of the coil pipe; and a second supply pipe which connects the coil pipe and the second body at a downstream side of the coil pipe, and a height of the first supply pipe may be fixed when the second body vertically moves, and the second supply pipe may be provided to be vertically moved along with the vertical movement of the second body when the second body vertically moves.

According to the exemplary embodiment, a cross-sectional area of a passage through which the fluid flows in the coil pipe may be formed to be smaller than a cross-sectional area of a pipe connected to an upper end of the coil pipe and a lower end of the coil pipe.

According to the exemplary embodiment, the pipe may be provided as a pipe in which a supercritical fluid flows.

According to the exemplary embodiment, the second body may be located below the first body, and the pipe may include: a first supply pipe connected to the first body to supply the fluid to the treatment space; a second supply pipe connected to the second body to supply the fluid to the treatment space; and a discharge pipe which discharges the fluid to the treatment space, and the coil pipe may be provided to each of the second supply pipe and the discharge pipe.

Another exemplary embodiment of the present invention provides a substrate treating apparatus, including: a housing provided with a first body and a second body which are combined with each other to form a treatment space in which an organic solvent remaining on a substrate is dried by a fluid for drying in a supercritical state; an actuator configured to move up and down the second body with respect to the first body to seal or open the treatment space; a support unit configured to support the substrate within the treatment space; and a discharge pipe coupled to the second body to discharge the fluid for drying in the supercritical state from the treatment space, in which the discharge pipe includes a coil pipe that is stretchable and contractible according to the up and down movement of the second body, and an upper end of the coil pipe is located upstream of the discharge pipe than a lower end of the coil pipe when the second body moves up and seals the treatment space.

According to the exemplary embodiment, the coil pipe may be provided to be compressed when the second body moves down.

According to the exemplary embodiment, the discharge pipe may further include: a first discharge pipe connected to a downstream side of the coil pipe; and a second discharge pipe which connects the coil pipe and the second body at the upstream side of the coil pipe, and a height of the first discharge pipe may be fixed when the second body vertically moves, and the second discharge pipe may be provided to be vertically moved along with the vertical movement of the second body when the second body vertically moves.

According to the exemplary embodiment, the second discharge pipe may include a first portion, a second portion, a third portion, and a fourth portion sequentially disposed from an upstream side to a downstream side of the discharge pipe, and the first portion may be extended in a down direction with respect to the ground from a point coupled to the second body, the second portion may be extended in a direction parallel to the ground from the first portion, the third portion may be extended vertically upward with respect to the ground from the second portion, and the fourth portion may be extended horizontally with respect to the ground from the third portion, and when the second body moves down, the first portion and the third portion may move in a down direction and the coil pipe is compressed.

According to the exemplary embodiment, a cross-sectional area of a passage through which the fluid for drying in the supercritical state flows in the coil pipe may be formed to be smaller than a cross-sectional area of a pipe connected to an upper end of the coil pipe and a lower end of the coil pipe.

Another exemplary embodiment of the present invention provides a substrate treating apparatus, including: a housing provided with a first body and a second body which are combined with each other to form a treatment space in which an organic solvent remaining on a substrate is dried by a fluid for drying in a supercritical state; an actuator configured to move up and down the second body with respect to the first body to seal or open the treatment space; a support unit configured to support the substrate within the treatment space; and a discharge pipe coupled to the second body to discharge the fluid for drying in the supercritical state from the treatment space, in which the discharge pipe includes a coil pipe that is stretchable and contractible according to the up and down movement of the second body, and an upper end of the coil pipe is located upstream of the discharge pipe than a lower end of the coil pipe when the second body moves up and seals the treatment space.

According to the exemplary embodiment, the supply pipe may further include: a first supply pipe connected to an upstream side of the coil pipe; and a second supply pipe which connects the coil pipe and the second body at a downstream side of the coil pipe, and a height of the first supply pipe may be fixed when the second body vertically moves, and the second supply pipe may be provided to be vertically moved along with the vertical movement of the second body when the second body vertically moves.

According to the exemplary embodiment, the second supply pipe may include a fifth portion and a sixth portion which are sequentially disposed from the coil pipe to a downstream side of the supply pipe, and the fifth portion may be extended in a down direction with respect to the ground from a point coupled to the second body, the sixth portion may be extended in a direction parallel to the ground from the fifth portion, and when the second body moves down, the fifth portion may move in the down direction and the coil pipe is tensioned.

According to the exemplary embodiment, a cross-sectional area of a passage through which the fluid for drying in the supercritical state flows in the coil pipe may be formed to be smaller than a cross-sectional area of a pipe connected to an upper end of the coil pipe and a lower end of the coil pipe.

According to the present invention, it is possible to stretch or contract a pipe in which a supercritical fluid moves according to vertical movement of a housing when a supercritical drying treatment is performed on a substrate.

According to the present invention, it is possible to prevent a pipe in which a supercritical fluid moves from being damaged when a supercritical drying treatment is performed on a substrate.

According to the present invention, it is possible to prevent backflow due to condensation of a supercritical fluid inside a pipe that discharges the supercritical fluid from a treatment space when a supercritical drying treatment is performed on a substrate.

The effect of the present invention is not limited to the foregoing effects, and those skilled in the art may clearly understand non-mentioned effects from the present specification and the accompanying drawings.

DETAILED DESCRIPTION

Figure 1:
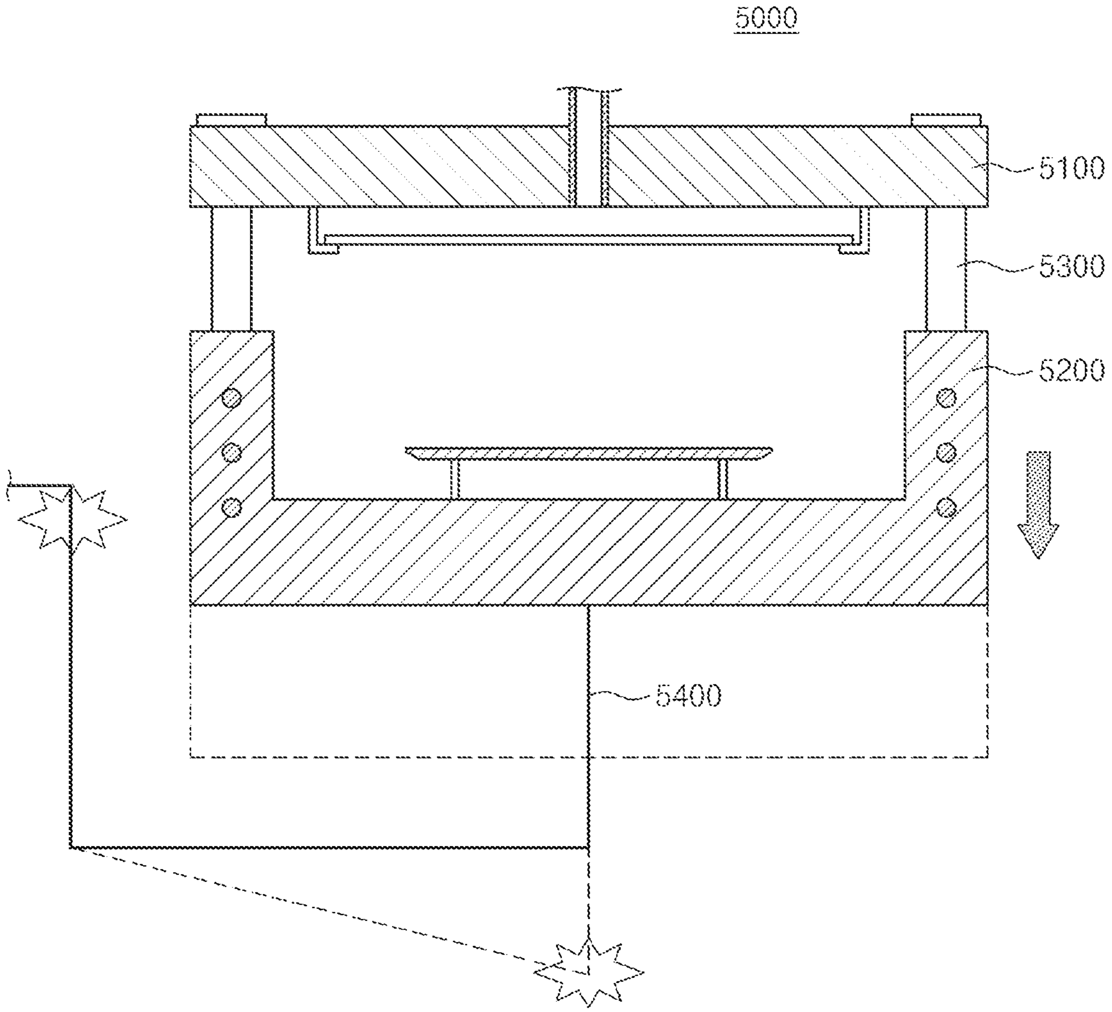
FIG. 1 is a cross-sectional diagram schematically illustrating a general substrate treating apparatus.

Hereinafter, an exemplary embodiment of the present invention will be described in more detail with reference to the accompanying drawings. An exemplary embodiment of the present invention may be modified in various forms, and the scope of the present invention should not be construed as being limited by the exemplary embodiment described below. The present exemplary embodiment is provided to more completely explain the present invention to those skilled in the art. Therefore, the shapes of components in the drawings are exaggerated to emphasize a clearer description.

In the present exemplary embodiment, a process of treating a substrate with a liquid by supplying the liquid, such as a cleaning solution, onto the substrate is described as an example. However, the present exemplary embodiment is not limited to the cleaning process, and may be applied to various processes, such as an etching process, an ashing process, and a developing process, of treating a substrate by using a treatment solution.

Hereinafter, a substrate treating apparatus 1 according to an exemplary embodiment of the present invention will be described with reference to FIGS. 2 to 10. The substrate treating apparatus 1 according to an exemplary embodiment of the present invention may perform a cleaning process including a supercritical drying process.

Figure 2:
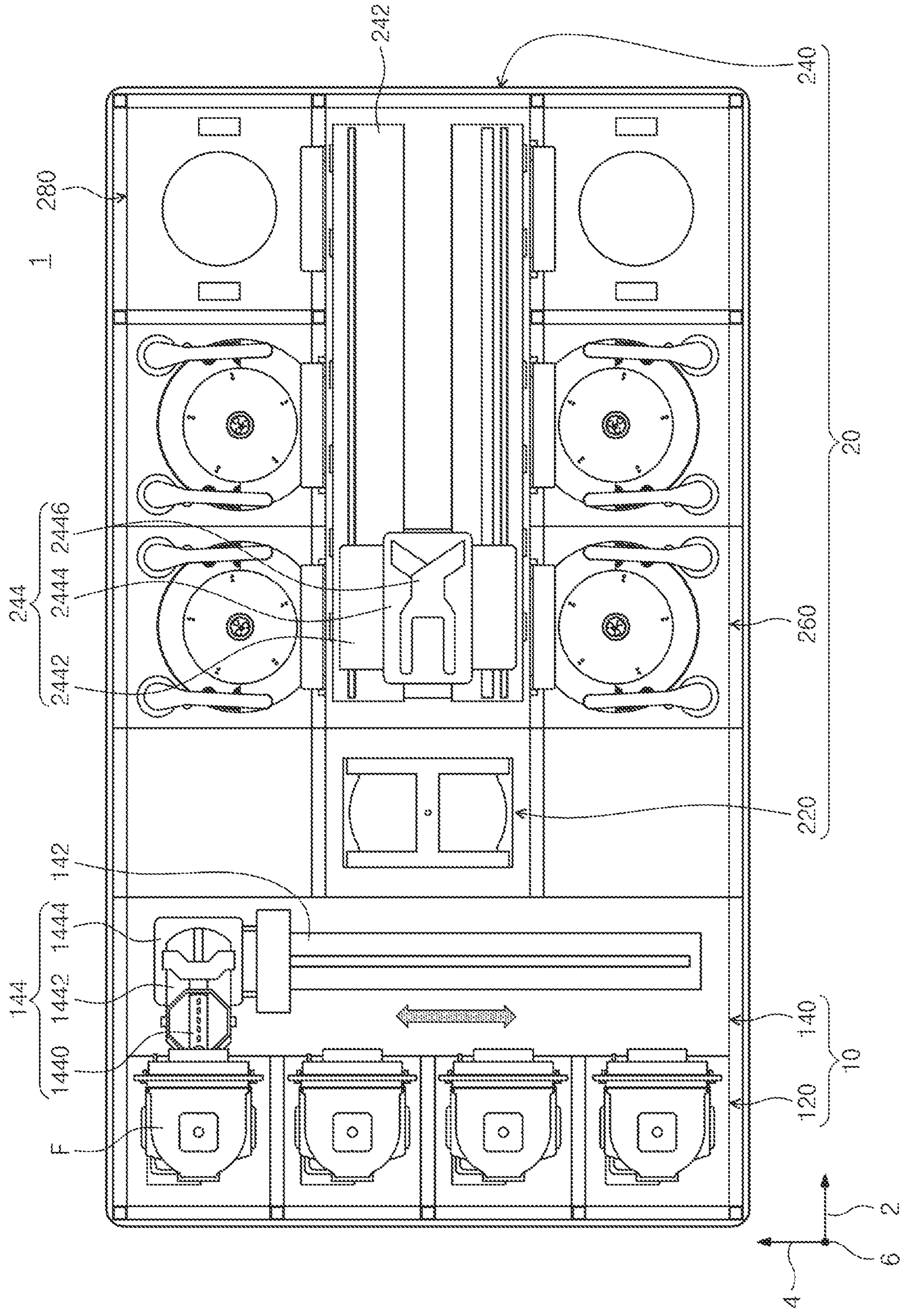
FIG. 2 is a diagram schematically illustrating a substrate treating apparatus according to an exemplary embodiment of the present invention.

FIG. 2 is a diagram schematically illustrating a substrate treating apparatus according to an exemplary embodiment of the present invention. Referring to FIG. 2, the substrate treating apparatus 1 includes an index module 10 and a treating module 20. According to the exemplary embodiment, the index module 10 and the treating module 20 are disposed in one direction. Hereinafter, a direction in which the index module 10 and the treating module 20 are arranged is called a first direction 2, a direction perpendicular to the first direction 2 when viewed from the top is called a second direction 4, and a direction perpendicular to a plane including both the first direction 2 and the second direction 4 is called a third direction 6.

The index module 10 transfers a substrate W to the treating module 020 which treats the substrate W from a vessel F in which the substrate W is accommodated. The index module 10 accommodates the substrate W that has been completely treated in the treating module 20 into the vessel F. A longitudinal direction of the index module 10 is the second direction 4. The index module 10 includes a load port 120 and an index frame 140.

The vessel F in which the substrate W is accommodated is seated in the load port 120. The load port 120 is positioned at an opposite side of the treating module 20 based on the index module 140. A plurality of load ports 120 may be provided and the plurality of load ports 120 may be arranged in the second direction 4. The number of load ports 120 may be increased or decreased according to process efficiency of the treating module 20 and a condition of foot print, and the like.

A plurality of slots (not illustrated) for accommodating the plurality of substrates W in a state where the substrates W are arranged horizontally with respect to the ground may be formed in the vessel F. As the vessel F, a Front Opening Unified Pod (FOUP) may be used. The vessel F may be placed on the load port 120 by a transfer means (not illustrated), such as an overhead transfer, an overhead conveyor, or an automatic guided vehicle, or an operator.

An index rail 142 and an index robot 144 are provided inside the index frame 140. The index rail 142 is provided inside the index frame 140 so that a longitudinal direction is the second direction 4. The index robot 144 may transfer the substrate W. The index robot 144 may transfer the substrate W between the index module 10 and a buffer unit 220. The index robot 144 may include an index hand 1440. The substrate W may be placed on the index hand 1440. The index hand 1440 may include an index base 1442 having an annular ring shape in which a part of a circumference is symmetrically bent, and an index support part 1444 that moves the index base 1442. The configuration of the index hand 1440 is the same as or similar to the configuration of the transfer hand which is to be described below. The index hand 1440 may be provided to be movable in the second direction 4 on the index rail 142. Therefore, the index hand 1440 is movable forward and backward along the index rail 142. Further, the index hand 1440 may be provided to be rotatable about the third direction 6 and be movable along the third direction 6.

The treating module 20 includes the buffer unit 220, a transfer chamber 240, a liquid treating chamber 260, and a drying chamber 280. The buffer unit 220 provides a space in which the substrate W loaded to the treating module 20 and the substrate W unloaded from the treating module 20 stay temporarily. The transfer chamber 240 provides a space for transferring the substrate W between the buffer unit 220 and the process chamber 260, and between the liquid treating chamber 260 and the drying chamber 280. The liquid treating chamber 260 performs a liquid treating process of treating the substrate W with a liquid by supplying the liquid onto the substrate W. For example, the liquid treating process may be a cleaning process of cleaning the substrate with a cleaning solution. Both chemical processing and rinse processing may be performed no the substrate within the process chamber. The drying chamber 280 performs the drying process of removing the liquid remaining on the substrate W.

The buffer unit 220 may be disposed between the index frame 140 and the transfer chamber 240. The buffer unit 220 may be positioned at one end of the transfer chamber 240. A slot (not illustrated) in which the substrate W is placed is provided inside the buffer unit 220. A plurality of slots (not illustrated) is provided so as to be spaced apart from each other in the third direction 6. A front face and a rear face of the buffer unit 220 are opened. The front face is a face facing the index module 10 and the rear face is a face facing the transfer chamber 240. The index robot 144 may approach the buffer unit 220 through the front face, and the transfer robot 244 which is to be described below may approach the buffer unit 220 through the rear face.

The transfer chamber 240 may be provided so that a longitudinal direction is the first direction 2. The liquid treating chamber 260 and the drying chamber 280 may be disposed in a lateral portion of the transfer chamber 240. The liquid treating chamber 260 and the transfer chamber 240 may be disposed in the second direction 4. The drying chamber 280 and the transfer chamber 240 may be disposed in the second direction 4.

According to an example, the liquid treating chambers 260 may be disposed at both sides of the transfer chamber 240, and the drying chambers 280 may be disposed at both sides of the transfer chamber 240, and the liquid treating chambers 260 may be disposed at positions closer to the buffer unit 220 than the drying chambers 280. At one side of the transfer chamber 240, the liquid treating chambers 260 may be provided in an arrangement of A×B (each of A and B is 1 or a natural larger than 1) in the first direction 2 and the third direction 6. At one side of the transfer chamber 240, the drying chambers 280 may be provided in number of C×D (each of C and D is 1 or a natural larger than 1) in the first direction 2 and the third direction 6. Unlike the description, only the liquid treating chambers 260 may be provided to one side of the transfer chamber 240, and only the drying chambers 280 may be provided to the other side.

The transfer chamber 240 includes a guide rail 242 and a transfer robot 244. The guide rail 242 is provided within the transfer chamber 240 so that a longitudinal direction is the first direction 2. The transfer robot 244 may be provided to be linearly movable in the first direction 2 on the guide rail 242. The transfer robot 244 transfers the substrate W between the buffer unit 220, the liquid treating chamber 260, and the drying chamber 280.

The transfer robot 2440 includes a base 2442, a body 2444, and an arm 2446. The base 2442 is installed to be movable in the first direction 2 along the guide rail 242. The body 2444 is coupled to the base 2442. The body 2444 is provided to be movable in the third direction 6 on the base 2442. Further, the base 2444 is provided to be rotatable on the base 2442. The arm 2446 is coupled to the body 2444 and is provided to be movable forwardly and backwardly with respect to the body 2444. A plurality of arms 2446 is provided to be individually driven. The arms 2446 are disposed to be stacked in the state of being spaced apart from each other in the third direction 6.

The liquid treating chamber 260 performs a liquid-treatment process on the substrate W. For example, the liquid treating chamber 260 may be a chamber performing a cleaning process by supplying a cleaning solution to the substrate W. Unlike this, the liquid treating chamber 260 may be a chamber performing a wet etching process of removing a thin film on the substrate by supplying liquid plasma. The liquid treating chamber 260 may have a different structure depending on the type of process treating the substrate W. Unlike this, each of the liquid treating chambers 260 may have the same structure. Optionally, the liquid treating chambers 260 are divided into a plurality of groups, and the liquid treating chambers 260 belonging to any one of the groups may be liquid treating chambers 260 that perform any one of the cleaning process and the wet etching process, and the liquid treating chambers 260 belonging to the other one of the groups may be liquid treating chambers 260 that perform the other of the cleaning process and the wet etching process.

Hereinafter, in the exemplary embodiment of the present invention, a case in which a liquid treating process of liquid treating the substrate W is performed by supplying a liquid onto the substrate W in the liquid treating chamber 260 will be described as an example.

Figure 3:
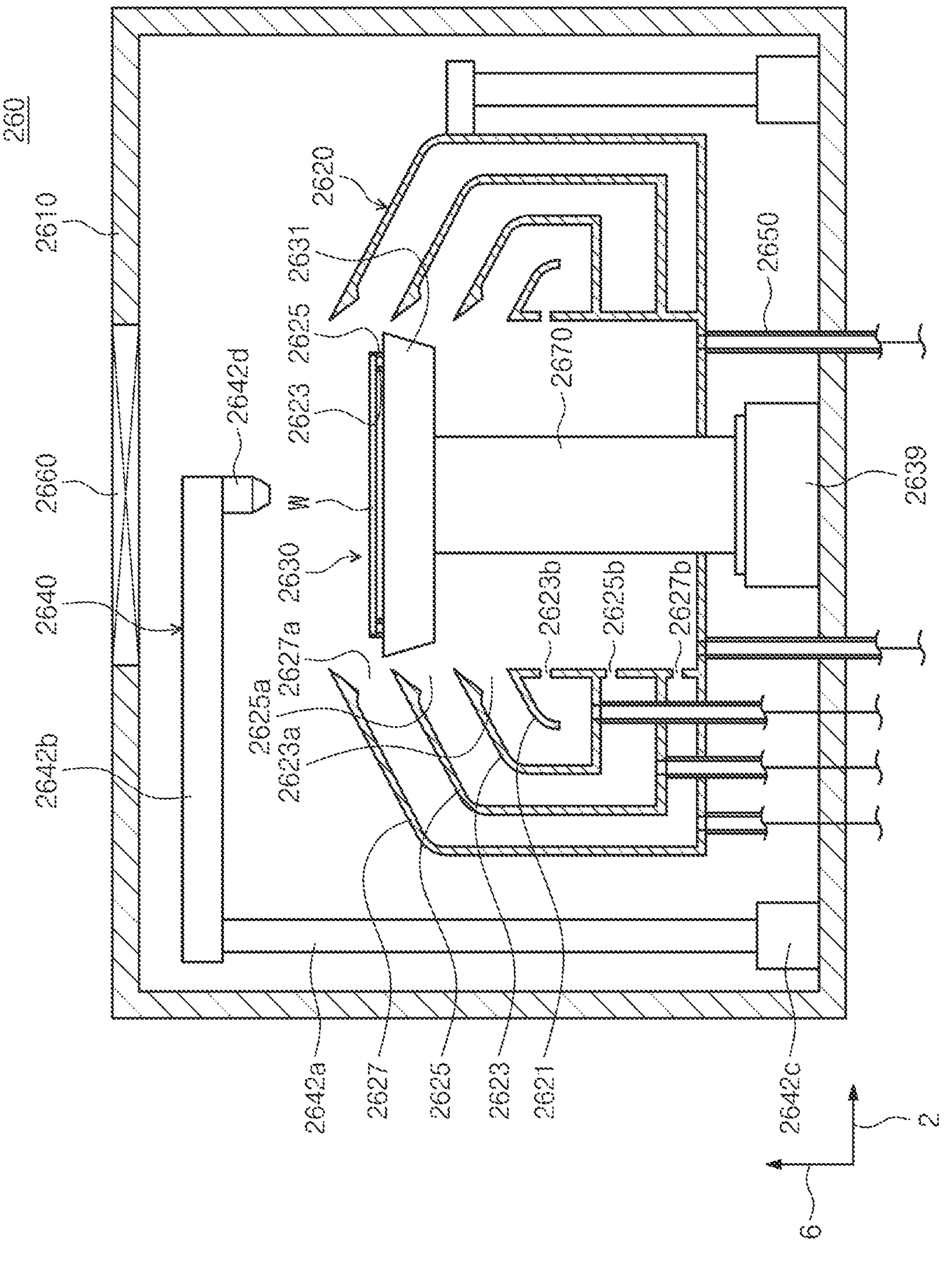
FIG. 3 is a diagram schematically illustrating an exemplary embodiment of a liquid treating chamber of the substrate treating apparatus of FIG. 2.

FIG. 3 is a diagram schematically illustrating an exemplary embodiment of the liquid treating chamber of the substrate treating apparatus of FIG. 2. Referring to FIG. 3, the liquid treating chamber 260 includes a housing 2610, a treating vessel 2620, a support unit 2630, a lifting unit 2640, a liquid supply unit 2650, an exhaust unit 2660, and an air flow supply unit 2680.

The housing 2610 has an inner space. The housing 2610 is provided in a generally rectangular parallelepiped shape. The treating vessel 2620, the support unit 2630, and the liquid supply unit 2640 are disposed within the housing 2610.

The treating vessel 2620 has a treatment space with an opened upper portion. The substrate W is liquid-treated within the treatment space. The support unit 2630 supports the substrate W in the treatment space and rotates the substrate W. The liquid supply unit 2640 supplies the liquid onto the substrate W supported by the support unit 2630. The liquid may be provided in a plurality of types, and may be sequentially supplied onto the substrate W.

According to an example, the processing vessel 2620 has a guide wall 2621 and a plurality of collection containers 2623, 2625, and 2627. Each of the collection containers 2623, 2625, and 2627 separates and collects different liquids from the liquids used for the substrate treatment. Each of the collection containers 2623, 2625, and 2627 has a collection space of recovering the liquid used for the treatment of the substrate. The guide wall 2621 and each of the collection containers 2623, 2625, and 2627 are provided in an annular ring shape surrounding the support unit 2630. The liquid scattered by the rotation of the substrate W when the liquid treatment process is in progress flows into the collection space through inlets 2623*a*, 2625*a*, and 2627*a* of the collection containers 2623, 2625, 2627 which are to be described later. Different types of treatment liquids may be introduced into the collection containers, respectively.

According to an example, the treating vessel 2620 has the guide wall 2621, the first collection container 2623, a second collection container 2625, and a third collection container 2627. The guide wall 2621 is provided in an annular ring shape surrounding the support unit 2630 and the first collection container 2623 is provided in an annular ring shape surrounding the guide wall 2621. The second collection container 2625 is provided in an annular ring shape surrounding the first collection container 2623, and the third collection container 2627 is provided in an annular ring shape surrounding the second collection container 2625. A space between the first collection container 2623 and the guide wall 2621 functions as a first inlet 2623*a* through which the liquid is introduced. A space between the first collection container 2623 and the second collection container 2625 functions as a second inlet 2625*a* through which the liquid is introduced. A space between the second collection container 2625 and the third collection container 2627 functions as a third inlet 2627*a* through which the liquid is introduced. The second inlet 2625*a* may be located above the first inlet 2623*a*, and the third inlet 2627*a* may be located above the second inlet 2625*a*.

A space between the lower end of the guide wall 2621 and the first collection container 2623 functions as a first outlet 2623*b* through which fume and airflow generated from the liquid are discharged. A space between the lower end of the first collection container 2623 and the second collection container bin 2625 functions as a second outlet 2625*b* through which fumes and airflow generated from the liquid are discharged. A space between the lower end of the second collection container 2625 and the third collection container bin 2627 functions as a third outlet 2627*b* through which fumes and airflow generated from the liquid are discharged. The fume and airflow discharged from the first outlet 2623*b*, the second outlet 2625*b*, and the third outlet 2627*b* are exhausted through an exhaust unit 2660 which is to be described later.

Collection lines 2623*c*, 2625*c*, and 2627*c* extending vertically downwards from the bottom surfaces of the collection containers 2623, 2625, and 2627 are connected to the collection containers 2623, 2625, and 2627, respectively. The collection lines 2623*c*, 2625*c*, and 2627*c* discharge the treatment liquids introduced through the collection containers 2623, 2625, and 2627, respectively. The discharged treatment liquid may be reused through an external treatment liquid regeneration system (not shown).

The support unit 2630 includes a spin chuck 2631, a support pin 2633, a chuck pin 2635, a rotation shaft 2637, and a driving unit 2639. The spin chuck 2631 has an upper surface that is provided with a generally circular shape when viewed from above. The upper surface of the spin chuck 2631 may be provided to have a larger diameter than the substrate W.

A plurality of support pins 2633 is provided. The support pins 2633 are disposed while being spaced apart from each other at a predetermined interval on the edge of the upper surface of the spin chuck 2631 and protrude upward from the spin chuck 2631. The support pins 2633 are arranged to have an annular ring shape as a whole by combination with each other. The support pin 2633 may support an edge of the rear surface of the substrate W so that the substrate W is spaced apart from the upper surface of the spin chuck 2631 at a predetermined distance.

A plurality of chuck pins 2635 is provided. The chuck pin 2635 is disposed farther from the center of the spin chuck 2631 than the support pin 2633. The chuck pin 2635 is provided to protrude from the upper surface of the spin chuck 2631. The chuck pin 2635 supports the lateral portion of the substrate W so that the substrate W is not laterally separated from the original position when the substrate W is rotated. The chuck pin 2635 is provided to be linearly movable between the standby position and the support position along a radial direction of the spin chuck 2631. The standby position is a position farther from the center of the spin chuck 2631 compared to the support position. When the substrate W is loaded into or unloaded from the support unit 2630, the chuck pin 2635 is positioned at the standby position, and when the process is performed on the substrate W, the chuck pin 2635 is positioned at the support position. At the support position, the chuck pin 2635 is in contact with the lateral portion of the substrate W.

The rotation shaft 2638 is coupled with the spin chuck 2631. The rotation shaft 2637 may be coupled to a lower surface of the spin chuck 2631. The rotation shaft 2637 may be provided such that the longitudinal direction faces the vertical direction. The rotation shaft 2637 is provided to be rotatable by receiving power from the driving unit 2639. The rotation shaft 2637 rotates by the driving unit 2639 to rotate the spin chuck 2631. The driving unit 2639 may vary a rotation speed of the rotation shaft 2637. The driving unit 2639 may be a motor providing driving force. However, the present invention is not limited thereto, and the driving unit 2639 may be variously modified to a known device that provides driving force.

The liquid supply unit 2640 supplies the liquid onto the substrate W supported by the support unit 2630. A plurality of liquid supply units 2640 is provided, and the liquid supply units 2640 supply different types of liquids, respectively. According to an example, the liquid supply unit 2640 includes a first liquid supplying member 2642 and a second liquid supplying member 2644.

The first liquid supplying member 2642 includes a support shaft 2642*a*, a support arm 2642*b*, an arm driver 2642*c*, and a nozzle 2642*d*. The support shaft 2642*a* is located on one side of the treating vessel 2620. The support shaft 2642*a* has a rod shape whose longitudinal direction faces the third direction 6. The support shaft 2642*a* is provided to be rotatable by an arm driver 2642*c*. The support arm 2642*b* is coupled to an upper end of the support shaft 2642*a*. The support arm 2642*b* is extended vertically the support shaft 2642*a*. The nozzle 2642*d* is fixedly coupled to the distal end of the support arm 2642*b*. As the support shaft 2642*a* is rotated, the nozzle 2642*d* is swingable with the support arm 2642*b*. The nozzle 2642*d* may be swingably moved to the process position and the standby position. Herein, the process position is a position where the nozzle 2642*d* faces the substrate W supported by the support unit 2630, and the standby position is a position where the nozzle 2642*d* is out of the process position.

Optionally, the support arm 2642*b* may be provided to be movable forward and backward in the longitudinal direction thereof. When viewed from the top, the nozzle 2642*d* may swing and move to coincide with the central axis of the substrate W.

The second liquid supplying member 2644 supplies a second liquid onto the substrate W supported by the support unit 2630. The second liquid supplying member 2644 is provided to have the same shape as that of the first liquid supply member 2642. Accordingly, a detailed description of the second liquid supplying member 2644 will be omitted.

The first treatment liquid and the second treatment liquid may be any one of a chemical, a rinse liquid, and an organic solvent. For example, the chemical may include diluted sulfuric acid ($H_2SO_4$), phosphoric acid ($P_2O_5$), hydrofluoric acid (HF), and ammonium hydroxide ($NH_4OH$). For example, the rinse solution may include water or deionized water (DIW). For example, the organic solvent may include alcohol, such as isopropyl alcohol (IPA).

The exhaust unit 2650 exhausts fumes and gas generated in the treatment space. The exhaust unit 2650 exhausts fumes and gases generated when the substrate W is treated with the liquid. The exhaust unit 2650 may be coupled to the bottom surface of the treating vessel 2620. In the exemplary embodiment, the exhaust unit 2650 may be provided in a space between the rotation shaft 2637 of the support unit 2630 and the inner side wall of the treating vessel 2620. The exhaust unit 2650 is provided with a decompression unit (not shown). The decompression unit exhausts fumes and gases generated when the substrate W is liquid-treated from the treatment space to the outside of the treatment space.

The airflow supply unit 2660 supplies an airflow to the inner space of the housing 2610. The airflow supply unit 2660 may supply a descending airflow to the inner space. The airflow supply unit 2660 may be installed in the housing 2610. The airflow supply unit 2660 may be installed above the treating vessel 2620 and the support unit 2630. The gas supplied to the inner space of the housing 2610 through the airflow supply unit 2660 forms a descending air flow in the inner space. A gaseous by-product generated by the treatment process in the treatment space is discharged to the outside of the housing 2610 through the exhaust line 2650 by the descending air flow. The airflow supply unit 2660 may be provided as a fan filter unit.

The substrate treating apparatus 1 may perform a supercritical process of treating the substrate W by using a supercritical fluid as a process fluid. The supercritical process is performed using the properties of the supercritical fluid. Representative examples thereof include a supercritical drying process and a supercritical etching process. Hereinafter, the supercritical process will be described based on the supercritical drying process. However, since this is only for ease of description, the substrate treating apparatus 1 may perform a supercritical process other than the supercritical drying process.

The supercritical drying process is performed by dissolving the organic solvent remaining in a circuit pattern of the substrate W with a supercritical fluid to dry the substrate W. The supercritical drying process has excellent drying efficiency and may prevent pattern collapse. As the supercritical fluid used in the supercritical drying process, a substance miscible with an organic solvent may be used. For example, supercritical carbon dioxide ($scCO_2$) may be used as the supercritical fluid.

Figure 4:
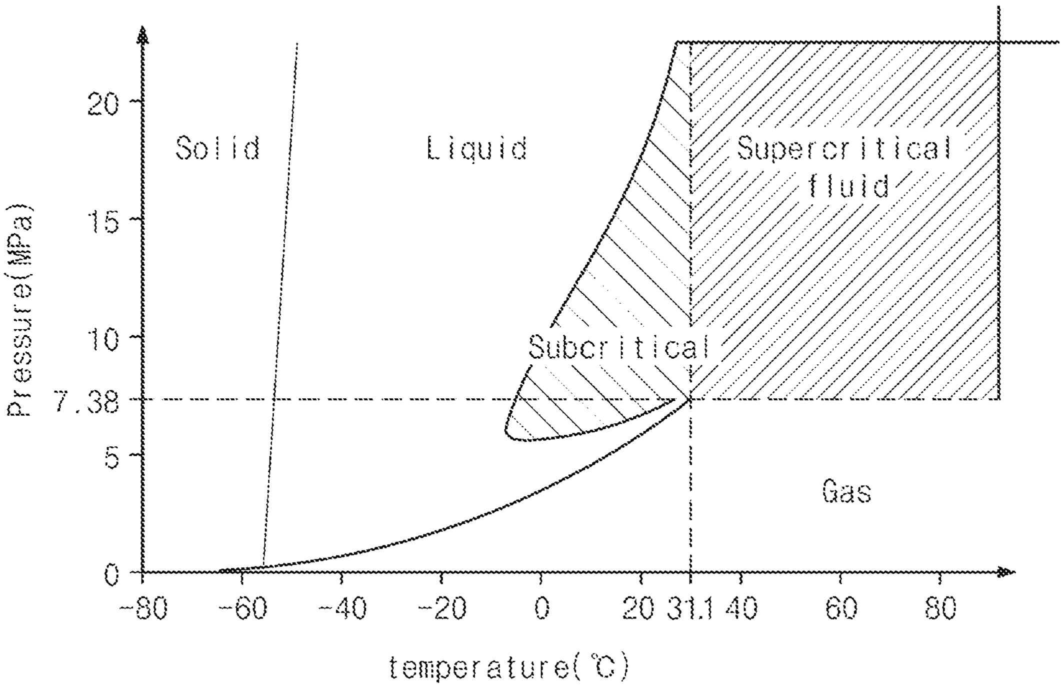
FIG. 4 is a diagram illustrating a phase change graph of carbon dioxide.

FIG. 4 is a diagram illustrating a phase change graph of carbon dioxide. Carbon dioxide has a critical temperature of 31.1° C. and a relatively low critical pressure of 7.38 MPa, so that carbon dioxide may be easily made to a supercritical state, and it is easy to control phase change of carbon dioxide by adjusting temperature and pressure, and carbon dioxide is low priced. In addition, carbon dioxide is non-toxic and harmless to the human body, and has characteristics of non-combustibility and inertness. Compared with water or other organic solvents, the diffusion coefficient of supercritical carbon dioxide is about 10 to 100 times higher, so that penetration of the supercritical carbon dioxide is fast, and the supercritical carbon dioxide is quickly replaced with the organic solvents. In addition, since supercritical carbon dioxide has almost no surface tension, the supercritical carbon dioxide has advantageous properties to be used for drying the substrate W including a fine circuit pattern. In addition, by-product of various chemical reactions of the supercritical carbon dioxide may be recycled, and at the same time, the supercritical carbon dioxide may be converted into a gas after being used in the supercritical drying process and the organic solvent may be separated and reused, so that there is less burdensome in terms of environmental pollution.

Figure 5:
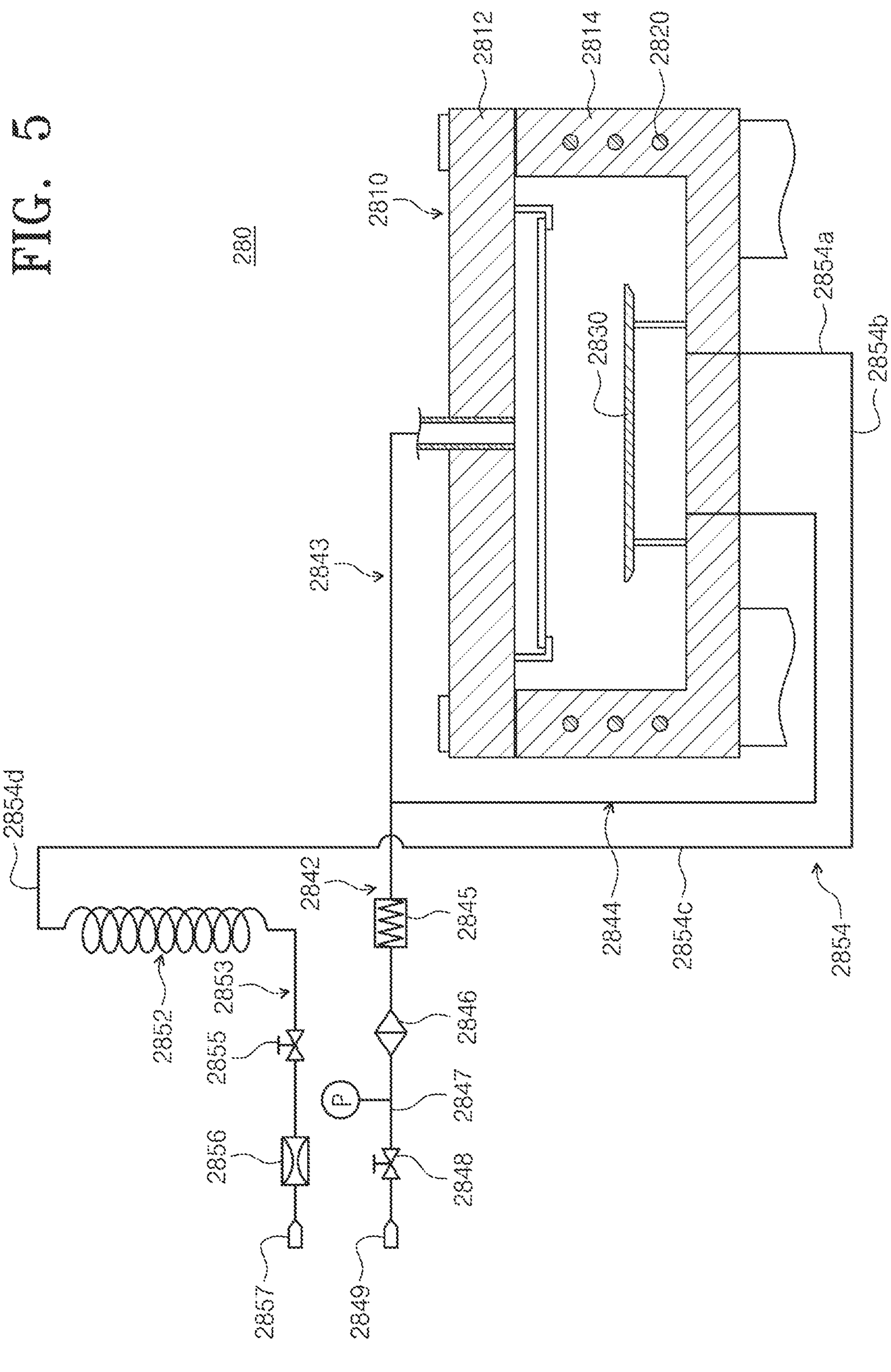
FIG. 5 is a diagram schematically illustrating an exemplary embodiment of a drying chamber of the substrate treating apparatus of FIG. 2.

FIG. 5 is a diagram schematically illustrating an exemplary embodiment of the drying chamber of FIG. 2. Referring to FIG. 5, the drying chamber 280 according to the exemplary embodiment of the present invention may remove the treatment liquid remaining on the substrate W by using a fluid for drying in a supercritical state. For example, the drying chamber 280 may perform a drying process of removing the organic solvent remaining on the substrate W by using carbon dioxide ($CO_2$) in a supercritical state.

The drying chamber 280 may include a housing 2810, a heating member 2820, a support member 2830, a fluid supply unit 2840, a fluid discharge unit 2850, and an actuator 2860.

The housing 2810 may provide a treatment space in which the substrate W is treated. The housing 2810 is made of a material capable of withstanding a high pressure greater than or equal to a critical pressure. The housing 2810 may include a first body 2812 and a second body 2814 that are combined with each other to provide a treatment space therein. The first body 2812 may be positioned above the second body 2814. Any one of the first body 2812 and the second body 2814 may be coupled to the actuator 2860 to be movable in the vertical direction. For example, the second body 2814 may be coupled to the actuator 2860 and moved in the vertical direction by the actuator 2860. Accordingly, the inner treatment space of the housing 281 may be selectively sealed. In the above-described example, the case where the second body 2814 is coupled to the actuator 2860 and moves in the vertical direction is described as an example, but the present invention is not limited thereto. For example, the first body 2812 may be coupled to the actuator 2860 to be movable in the vertical direction.

Hereinafter, for convenience of description, a case in which the second body 2814 is coupled with the actuator 2860 and moves in the vertical direction will be described as an example.

The heating member 2820 may heat the treatment fluid supplied to the treatment space. The heating member 2820 may increase a temperature inside the treatment space. As the heating member 2820 increases the temperature of the treatment space, the treatment fluid supplied to the treatment space may be converted into a supercritical state or may be maintained in a supercritical state.

Also, the heating member 2820 may be embedded in the housing 2810. For example, the heating member 2820 may be embedded in any one of the first body 2812 and the second body 2814. For example, the heating element 2820 may be provided in the second body 2814. The present invention is not limited thereto, and the heating member 2820 may be provided at various positions capable of increasing the temperature of the treatment space. The heating member 2820 may be a heater. However, the present invention is not limited thereto, and the heating member 2820 may be variously modified into a known device capable of increasing the temperature of the treatment space.

The support member 2830 may support the substrate W in the treatment space. The support member 2830 may be configured to support the edge region of the substrate W in the treatment space. For example, the support member 2830 may be configured to support the lower surface of the edge region of the substrate W in the treatment space.

The fluid supply unit 2840 may supply a treatment fluid to the treatment space. The treatment fluid supplied by the fluid supply unit 2840 may include carbon dioxide. The treatment fluid supplied by the fluid supply unit 2840 may be supplied to the treatment space in a supercritical state or may be converted into a supercritical state in the treatment space. The fluid supply unit 2840 may include a supply pipe 2841, a heater 2845, a filter 2846, a pressure sensor 2847, a valve 2848, and a fluid supply source 2849.

The supply pipe 2841 may supply a treatment fluid to the treatment space. The supply pipe 2841 may be connected to the housing 2810. The supply pipe 2841 may include a main supply pipe 2842, an upper supply pipe 2843, and a lower supply pipe 2844. The main supply pipe 2842 may be connected to a fluid supply source 2849 which is to be described later. The upper supply pipe 2843 may be branched from the main supply pipe 2842 and may be connected to the first body 2812. Accordingly, the upper supply pipe 2843 may supply the treatment fluid to the upper region of the treatment space. The lower supply pipe 2844 may be branched from the main supply pipe 2842 and may be connected to the second body 2814. Accordingly, the lower supply pipe 2844 may supply the treatment fluid to the lower region of the treatment space.

In the above-described example, the case where the main supply pipe 2842 is connected to the fluid supply source 2849 has been described as an example, but is not limited thereto. For example, a plurality of fluid supply sources 2849 is provided, the upper supply pipe 2843 may be connected to any one of the plurality of fluid supply sources 2849, and the lower supply pipe 2844 may be connected with another one of the plurality of fluid supply sources 2849.

The heater 2845 may be installed in the supply pipe 2841. The heater 2845 may be installed upstream of the supply pipe 2841. The heater 2845 may be installed in the main supply pipe 2842. The heater 2845 may heat the supply pipe 2841 to control the temperature of the treatment fluid flowing (or remaining) in the supply pipe 2841. Optionally, the heater 2845 may be installed in each of the upper supply pipe 2842 and the lower supply pipe 2843.

The filter 2846 may filter the treatment fluid delivered to the treatment space from the fluid supply source 2849 which is to be described below. For example, filter 2846 may filter impurities that may be included in the treatment fluid delivered to the treatment space . The filter 2846 may be installed in the supply pipe 2841. The filter 2846 may be installed upstream of the supply pipe 2841. The filter 2846 may be installed in the main supply pipe 2842. Optionally, the filter 2846 may be installed in each of the upper supply pipe 2842 and the lower supply pipe 2843.

The pressure sensor 2847 may measure the pressure in the treatment space and/or the supply pipe 2841. The pressure sensor 2847 may be installed in the supply pipe 2841. The pressure sensor 2847 may be installed upstream of the supply pipe 2841. The pressure sensor 2847 may be installed in the main supply pipe 2842. Optionally, the pressure sensor 2847 may be installed in each of the upper supply pipe 2842 and the lower supply pipe 2843.

The valve 2848 may be installed in the supply pipe 2841. The valve 2848 may be installed in the upstream of the supply pipe 2841. The valve 2848 may be installed in the main supply pipe 2842. Optionally, the valve 2848 may be installed in each of the upper supply pipe 2842 and the lower supply pipe 2843. The valve 2848 may be a flow control valve. Optionally, the valve 2848 may be an on/off valve. Whether to supply the treatment fluid to the treatment space may be determined based on the opening and closing of the valve 2848.

A fluid supply source 2849 may store and/or supply the treatment fluid. The fluid supply source 2849 may be a reservoir. The fluid supply source 2849 may deliver the treatment fluid to the supply piping 2841.

The fluid discharge unit 2850 may discharge the treatment fluid from the treatment space of the housing 2810. The fluid discharge unit 2850 may include a discharge pipe 2851, a pressure reducing valve 2855, a pressure control member 2856, and a collection tank 2857.

The discharge pipe 2851 may discharge the treatment fluid from the treatment space. The discharge pipe 2851 may discharge the treatment fluid supplied to the treatment space to the outside of the housing 2810. The discharge pipe 2851 may be connected with the housing 2810. The discharge pipe 2851 may be connected to the second body 2814. The discharge pipe 2851 may include a stretchable pipe 2852, a first discharge pipe 2853, and a second discharge pipe 2854.

Hereinafter, the upstream and the downstream are defined based on a direction in which the treatment fluid flows within the discharge pipe 2851. Specifically, since the treatment fluid flows from the housing 2810 within the discharge pipe 2851, a point relatively close to the point connected to the second body 2814 within the discharge pipe 2851 is defined as upstream, and a point away from the second body 2814 within the discharge pipe 2851 in the direction in which the treatment fluid flows is defined as downstream.

The stretchable pipe 2852 may be stretched and contracted according to the vertical movement of the housing 2810. The stretchable pipe 2852 may be stretched and contracted according to the vertical movement of the second body 2814. The stretchable pipe 2852 may be provided as a coil pipe. Optionally, the stretchable pipe 2852 may be provided as a flexible pipe. An upper end of the stretchable pipe 2852 may be located upstream of the discharge pipe 2851 than a lower end of the stretchable pipe 2852. That is, the stretchable pipe 2852 may be located at a point where the relative height with respect to the ground increases from the downstream side to the upstream side. Hereinafter, the case in which the stretchable pipe 2852 is provided as a coil pipe will be described as an example.

In the coil pipe 2852, a cross-sectional area of a flow passage through which the treatment fluid flows may be provided to be smaller than cross-sectional areas of flow passages of the first discharge pipe 2853 and the second discharge pipe 2854 through which the treatment fluid flows. This is because, when the cross-sectional area of the passage of the coil pipe 2852 is formed to be large, the magnitude of the compressive force and/or tensile force required for expansion and contraction increases. Accordingly, by providing the small cross-sectional area of the flow passage through which the treatment fluid flows in the coil pipe 2852, the coil pipe 2852 may be easily tensioned and/or compressed according to the vertical movement of the second body 2814.

The first discharge pipe 2853 may be connected to the downstream side of the coil pipe 2852. One end of the first discharge pipe 2853 may be connected to the lower end of the coil pipe 2852 and extend toward the downstream of the discharge pipe 2851. The pressure reducing valve 2855, the pressure adjusting member 2856, and the collection tank 2857, which will be described later, may be installed in the first discharge pipe 2853.

The second discharge pipe 2854 may connect the coil pipe 2852 and the second body 2814 to each other. The second discharge pipe 2854 may be connected to the upstream side of the coil pipe 2852. One end of the second discharge pipe 2854 may be connected to the upper end of the coil pipe 2852 and extend toward the upstream of the discharge pipe 2851 to be connected to the second body 2814.

The second discharge pipe 2854 may be provided as a first portion 2854*a*, a second portion 2854*b*, a third portion 2854*c*, and a fourth portion 2854*d*. The first portion 2854*a*, the second portion 2854*b*, the third portion 2854*c*, and the fourth portion 2854*d* may be sequentially disposed from the upstream to the downstream of the discharge pipe 2851. One end of the first portion 2854*a* may be connected to the second body 2814. A longitudinal direction of the first portion 2854*a* may extend downward with respect to the ground from one end to the other end. One end of the second portion 2854*b* may be connected to the other end of the first portion 2854*a*. The longitudinal direction of the second portion 2854*b* may extend in a direction parallel to the ground from one end to the other end. One end of the third portion 2854*c* may be connected to the other end of the second portion 2854*b*. The longitudinal direction of the third portion 2854*c* may extend vertically from one end to the other end in an upward direction with respect to the ground. One end of the fourth portion 2854*d* may be connected to the other end of the third portion 2854*c*. The longitudinal direction of the fourth portion 2854*d* may extend horizontally from one end to the other end with respect to the ground. The other end of the fourth portion 2854*d* may be connected to the upper end of the coil pipe 2852. The second discharge pipe 2854 is not limited thereto, and may be provided while being transformed into various shapes.

The pressure reducing valve 2855 may allow the treatment fluid to be selectively discharged from the treatment space. The pressure reducing valve 2855 may selectively allow the treatment fluid to flow to the discharge piping 2851. The pressure reducing valve 2855 may be an on/off valve. The pressure reducing valve 2855 may be installed in the first discharge pipe 2853.

The pressure adjusting member 2856 may constantly maintain a pressure in the treatment space at a set pressure. For example, the pressure adjusting member 2856 may measure the pressure of the treatment fluid flowing in the discharge pipe 2851. Also, the pressure adjusting member 2856 may measure the pressure of the treatment space based on the pressure of the treatment fluid flowing in the discharge pipe 2851. Also, the pressure adjusting member 2856 may adjust the discharge flow rate per unit time of the treatment fluid discharged through the discharge pipe 2851 so as to maintain the pressure of the treatment space at the set pressure. For example, the pressure adjusting member 2856 may be a Back Pressure Regulator (BPR). The pressure adjusting member 2856 may be installed in the first discharge pipe 2853.

The collection tank 2857 may provide a space to store the treatment fluid discharged from the treatment space. The treatment fluid used in the supercritical drying process stored in the collection tank 2857 may be converted into gas to separate the organic solvent and be reused. The collection tank 2857 may be installed in the first discharge pipe 2853. As an example, the collection tank 2857 may be installed downstream of the first discharge pipe 2853 than the pressure reducing valve 2855 and the pressure adjusting member 2856.

Figure 6:
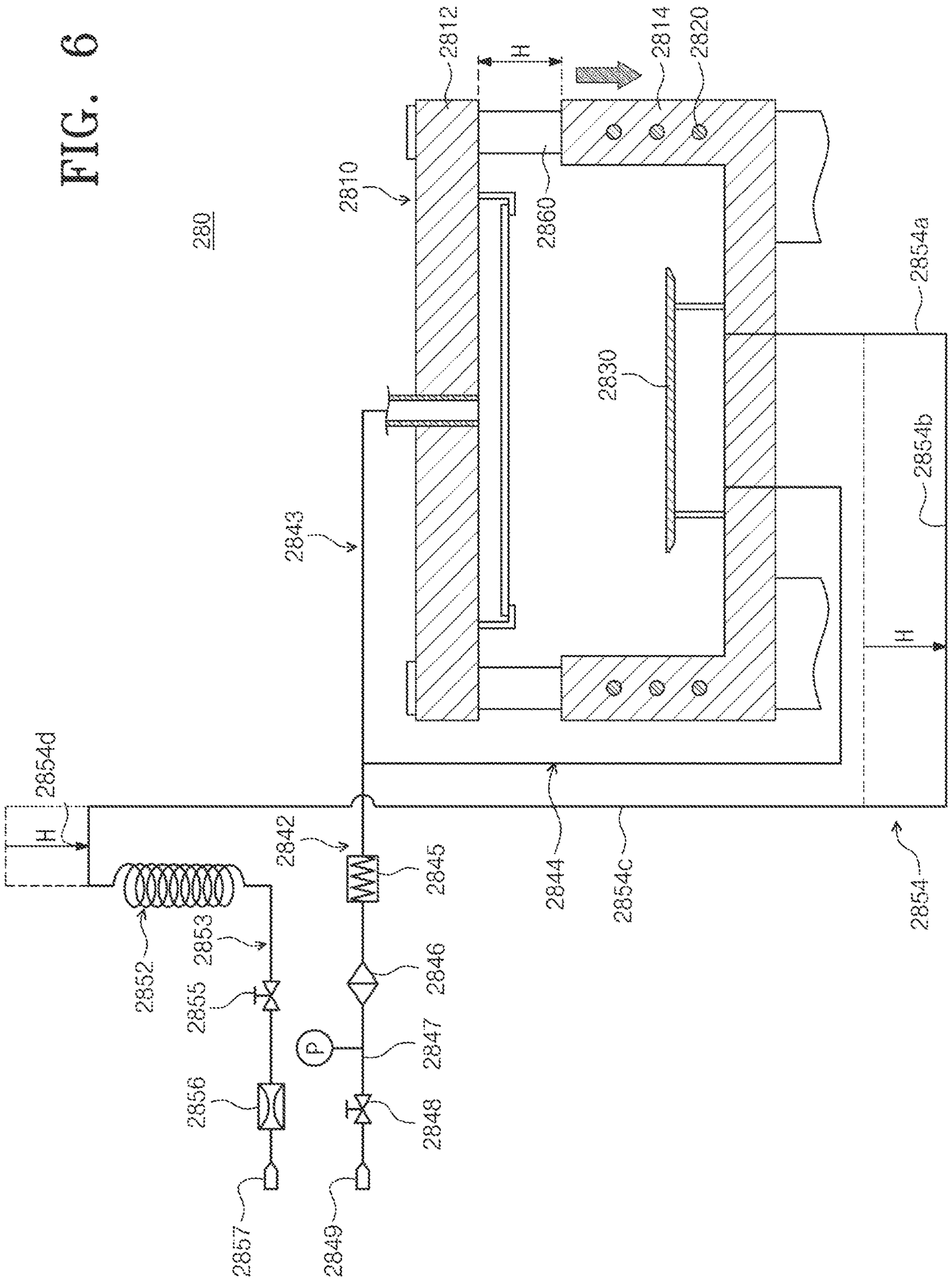
FIG. 6 is a diagram schematically illustrating the drying chamber in the case where a second body of FIG. 2 moves down.

FIG. 6 is a diagram schematically illustrating the drying chamber in the case where the second body of FIG. 2 moves down. Hereinafter, the discharge pipe according to the exemplary embodiment will be described in detail with reference to FIG. 6.

The drying chamber 280 may remove the treatment liquid remaining on the substrate W by using a fluid for drying in a supercritical state. For example, the drying chamber 280 may perform a drying process of removing the organic solvent remaining on the substrate W by using carbon dioxide ($CO_2$) in a supercritical state. The supercritical drying process includes a substrate loading process S100 of loading the substrate W into the treatment space, a pressurizing process S200 of pressurizing the atmosphere in the treatment space, a decompressing process S300 of returning the atmosphere in the treatment space to normal pressure, and a substrate unloading process S400 of unloading the substrate W from the treatment space.

In the substrate loading process S100, the second body 2814 moves up and down toward the first body 2814 by the actuator 2860 in order to load the substrate W into the treatment space. In the substrate unloading process S400, the second body 2814 moves down in a direction away from the first body 2812 by the actuator 2860 in order to unload the substrate W from the treatment space.

Referring to FIG. 6, after the drying process is completed by the treatment fluid in the treatment space, the second body 2814 is moved downward by the actuator 2860. As an example, it is assumed that the distance that the second body 2814 moves in the downward direction is H based on the sealed state of the first body 2812 and the second body 2814. The pressure reducing valve 2855, the pressure adjusting member 2856, the collection tank 2857, and the like are installed in the first discharge pipe 2853 connected downstream of the coil pipe 2852, so that when the second body 2814 moves up and down, the first discharge pipe 2853 is provided so that the height thereof is fixed. As the first discharge pipe 2853 acts as a fixing part, when the second body 2814 moves downward, the coil pipe 2852 may be stretched and contracted. When the second body 2814 moves downward, the coil pipe 2852 may be compressed. As the coil pipe 2852 expands and contracts by the displacement H, when the second body 2814 moves downward, the second discharge pipe 2854 moves downward by the movement distance H of the second body 2814 together. When the second body 2814 moves downward, the first portion 2854*a* and the third portion 2854*c* may move downward by the distance H.

When the supercritical drying treatment is performed on the substrate, the discharge pipe 2851 through which the supercritical fluid flows may also be moved according to the movement of the second body 2814. Accordingly, when the second body 2814 moves, it is possible to minimize the technical disadvantage that the pipe cannot be moved, so that the pipe is damaged or plastic deformation occurs in the pipe. When the supercritical drying treatment is performed on the substrate, it is possible to minimize the pipe impact applied to the discharge pipe 2851 through which the supercritical fluid flows. Damage to various equipment installed in the discharge pipe 2851 may be minimized It is possible to prevent the supercritical fluid from leaking out of the pipe and contamination of the facility due to pipe damage.

In the coil pipe 2852, a cross-sectional area of a flow passage through which the treatment fluid flows may be provided to be smaller than a cross-sectional area of a flow passage of the first pipe 2853 and the second pipe 2854 through which the treatment fluid flows. This is because, when the cross-sectional area of the passage of the coil pipe 2852 is formed to be large, the magnitude of the compressive force and/or tensile force required for expansion and contraction increases. Accordingly, by providing the small cross-sectional area of the flow passage through which the treatment fluid flows in the coil pipe 2852, the coil pipe 2852 may be easily tensioned and/or compressed according to the vertical movement of the second body 2814. In general, when the fluid flow cross-sectional area of a pipe becomes small, a liquefaction phenomenon due to condensation of the fluid may be caused due to a decrease in the temperature of the fluid flowing in the pipe. Accordingly, in the present exemplary embodiment, the upper end of the coil pipe 2852 is positioned upstream of the discharge pipe 2851 than the lower end of the coil pipe 2852 to prevent backflow due to condensation of the treatment fluid flowing in the discharge pipe 2851. Therefore, it is possible to prevent back contamination into the treatment space due to the backflow of the treatment fluid in the discharge pipe 2851.

In the above-described exemplary embodiment, the case where when the second body 2814 moves downward by the distance H, the coil pipe 2852 expands and contracts by the displacement H, and the first portion 2854*a* and the third portion 2854*c* are moved in the downward direction by the distance H has been described, but this has been described as an example to describe the present exemplary embodiment. According to the distance H by which the second body 2814 moves, the coil pipe 2852, the first portion 2854*a*, and the third portion 2854*c* may move downward with a value approximate to the displacement H.

In the above-described exemplary embodiment, the case where the stretchable pipe 2852 is provided between the first discharge pipe 2853 and the second discharge pipe 2854 has been described as an example. However, the present invention is not limited thereto, and the second portion 2854*b* may be provided with a pipe that can be stretched and contracted according to the vertical movement of the second body 2814. For example, the second portion 2854*b* may be provided as a flexible pipe. Accordingly, the pipe impact applied to the second portion 2854*b*, which is easily damaged by the vertical movement of the second body 2814, may be alleviated.

Figure 7:
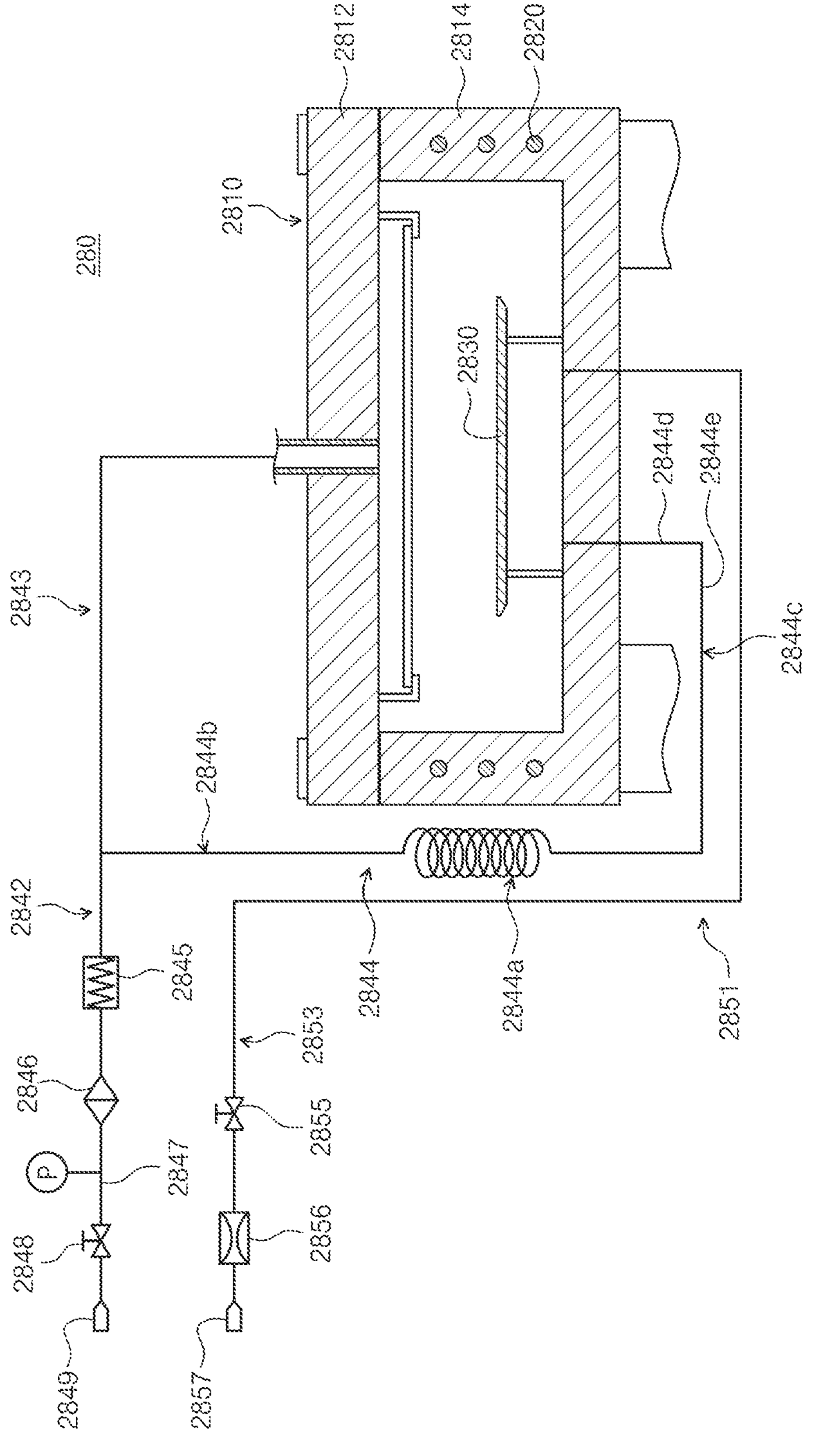
FIG. 7 is a diagram schematically illustrating another exemplary embodiment of the drying chamber of FIG. 5.

FIG. 7 is a diagram schematically illustrating another exemplary embodiment of the drying chamber of FIG. 5. The drying chamber 280 may include a housing 2810, a heating member 2820, a support member 2830, a fluid supply unit 2840, a fluid discharge unit 2850, and an actuator 2860. In the present exemplary embodiment, the housing 2810, the heating member 2820, the support member 2830, and the actuator 2860 included in the drying chamber 280 of FIG. 5 are similarly provided. Accordingly, descriptions of the housing 2810, the heating member 2820, the support member 2830, and the actuator 2860 of the drying chamber 280 will be omitted below.

Referring to FIG. 7, the fluid supply unit 2840 may supply a treatment fluid to a treatment space. The treatment fluid supplied by the fluid supply unit 2840 may include carbon dioxide. The treatment fluid supplied by the fluid supply unit 2840 may be supplied to the treatment space in a supercritical state or may be converted into a supercritical state in the treatment space. The fluid supply unit 2840 may include a supply pipe 2841, a heater 2845, a filter 2846, a pressure sensor 2847, a valve 2848, and a fluid supply source 2849.

The supply pipe 2841 may supply a treatment fluid to the treatment space. The supply pipe 2841 may be connected to the housing 2810. The supply pipe 2841 may include a main supply pipe 2842, an upper supply pipe 2843, and a lower supply pipe 2844. The main supply pipe 2842 may be connected to a fluid supply source 2849 which is to be described later. The upper supply pipe 2843 may be branched from the main supply pipe 2842 and may be connected to the first body 2812. Accordingly, the upper supply pipe 2843 may supply the treatment fluid to the upper region of the treatment space. The lower supply pipe 2844 may be branched from the main supply pipe 2842 and may be connected to the second body 2814. Accordingly, the lower supply pipe 2844 may supply the treatment fluid to the lower region of the treatment space.

In the above-described example, the case where the main supply pipe 2842 is connected to the fluid supply source 2849 has been described as an example, but is not limited thereto. For example, a plurality of fluid supply sources 2849 is provided, the upper supply pipe 2843 may be connected to any one of the plurality of fluid supply sources 2849, and the lower supply pipe 2844 may be connected with another one of the plurality of fluid supply sources 2849.

The lower supply pipe 2844 may include a stretchable pipe 2844*a*, a first supply pipe 2844*b*, and a second supply pipe 2844*c*. Hereinafter, the upstream and the downstream are defined based on a direction in which the treatment fluid flows within the lower discharge pipe 2844. Specifically, in the lower supply pipe 2844, the treatment fluid flows from the fluid supply source 2849 toward the housing 2810, so a point that is relatively close to a point connected to the fluid supply source 2849 in the lower supply pipe 2844 is defined as upstream, and a point relatively close to a point connected to the second body 2814 within the lower supply pipe 2844 is defined as downstream.

The stretchable pipe 2844*a* may be stretched and contracted according to the vertical movement of the housing 2810. The stretchable pipe 2844*a* may be stretched and contracted according to the vertical movement of the second body 2814. The stretchable pipe 5844*a* may be provided as a coil-tube. Optionally, the stretchable pipe 2855*a* may be provided as a flexible pipe. The upper end of the stretchable pipe 2844*a* may be located upstream of the lower supply pipe 2844 than the lower end of the stretchable pipe 2844*a*. That is, the expansion and contraction pipe 2844*a* may be located at a point where the height relative to the ground decreases from the upstream side to the downstream side. Hereinafter, a case in which the stretchable pipe 2844*a* is provided as a coil pipe will be described as an example.

A cross-sectional area of a flow passage of the coil pipe 2844*a* through which the treatment fluid flows may be provided to be smaller than cross-sectional areas of flow passages of the first supply pipe 2844*b* and the second supply pipe 2844*c* through which the treatment fluid flows. This is because, when the cross-sectional area of the passage of the coil pipe 2844*a* is formed to be large, the magnitude of the compressive force and/or tensile force required for expansion and contraction increases. Accordingly, by providing the small cross-sectional area of the flow passage through which the treatment fluid flows in the coil pipe 2844*a*, the coil pipe 2844*a* may be easily tensioned and/or compressed according to the vertical movement of the second body 2814.

The first supply pipe 2844*b* may be connected to the upstream side of the coil pipe 2844*a*. One end of the first supply pipe 2844*b* may be connected to an upper end of the coil pipe 2844*a*, and the other end of the first supply pipe 2844*b* may be connected to the upper supply pipe 2843. Optionally, one end of the first supply pipe 2844*b* may be connected to an upper end of the coil pipe 2844*a*, and the other end of the first supply pipe 2844*b* may be connected to the main supply pipe 2842.

The second supply pipe 2844*c* may connect the coil pipe 2844*a* and the second body 2814 to each other. The second supply pipe 2844*c* may be connected to the downstream side of the coil pipe 2844*a*. One end of the second supply pipe 2844*c* may be connected to the lower end of the coil pipe 2844*a* and extend toward the downstream of the lower supply pipe 2844 to be connected to the second body 2814.

The second supply pipe 2844*c* may be provided as a fifth portion 2844*d* and a sixth portion 2844*e*. The fifth portion 2844*d* and the sixth portion 2844*e* may be sequentially disposed from the downstream to the upstream of the lower supply pipe 2844. One end of the fifth portion 2844*d* may be connected to the second body 2814. The longitudinal direction of the fifth portion 2844*d* may extend downward with respect to the ground from one end to the other end. One end of the sixth portion 2844*e* may be connected to the other end of the fifth portion 2844*d*. The longitudinal direction of the sixth portion 2844*e* may extend downward with respect to the ground from one end to the other end. The shape of the second supply pipe 2844*c* is not limited thereto, and may be provided by being modified into various shapes.

The heater 2845 may be installed in the supply pipe 2841. The heater 2845 may be installed upstream of the supply pipe 2841. The heater 2845 may be installed in the main supply pipe 2842. The heater 2845 may heat the supply pipe 2841 to control the temperature of the treatment fluid flowing (or remaining) in the supply pipe 2841.

The filter 2846 may filter the treatment fluid delivered to the treatment space from the fluid supply source 2849 which is to be described below. For example, filter 2846 may filter impurities that may be included in the treatment fluid delivered to the treatment space. The filter 2846 may be installed in the supply pipe 2841. The filter 2846 may be installed upstream of the supply pipe 2841. For example, the filter 2846 may be installed in the main supply pipe 2842.

The pressure sensor 2847 may measure the pressure in the treatment space and/or the supply pipe 2841. The pressure sensor 2847 may be installed in the supply pipe 2841. The pressure sensor 2847 may be installed upstream of the supply pipe 2841. For example, the pressure sensor 2847 may be installed in the main supply pipe 2842.

The valve 2848 may be installed in the supply pipe 2841. The valve 2848 may be installed in the upstream of the supply pipe 2841. The valve 2848 may be installed in the main supply pipe 2842. The valve 2848 may be a flow control valve. Optionally, the valve 2848 may be an on/off valve. Whether to supply the treatment fluid to the treatment space may be determined based on the opening and closing of the valve 2848.

A fluid supply source 2849 may store and/or supply the treatment fluid. The fluid supply source 2849 may be a reservoir. The fluid supply source 2849 may deliver the treatment fluid to the supply piping 2841.

The fluid discharge unit 2850 may discharge the treatment fluid from the treatment space of the housing 2810. The fluid discharge unit 2850 may include a discharge pipe 2851, a pressure reducing valve 2855, a pressure control member 2856, and a collection tank 2857.

The discharge pipe 2851 may discharge the treatment fluid from the treatment space. The discharge pipe 2851 may discharge the treatment fluid supplied to the treatment space to the outside of the housing 2810. The discharge pipe 2851 may be connected with the housing 2810. The discharge pipe 2851 may be connected to the second body 2814.

The pressure reducing valve 2855 may allow the treatment fluid to be selectively discharged from the treatment space. The pressure reducing valve 2855 may selectively allow the treatment fluid to flow to the discharge piping 2851. The pressure reducing valve 2855 may be an on/off valve.

The pressure adjusting member 2856 may constantly maintain a pressure in the treatment space at a set pressure. For example, the pressure adjusting member 2856 may measure the pressure of the treatment fluid flowing in the discharge pipe 2851. Also, the pressure adjusting member 2856 may measure the pressure of the treatment space based on the pressure of the treatment fluid flowing in the discharge pipe 2851. Also, the pressure adjusting member 2856 may adjust the discharge flow rate per unit time of the treatment fluid discharged through the discharge pipe 2851 so as to maintain the pressure of the treatment space at the set pressure. For example, the pressure adjusting member 2856 may be a Back Pressure Regulator (BPR).

The collection tank 2857 may provide a space to store the treatment fluid discharged from the treatment space. The treatment fluid used in the supercritical drying process stored in the collection tank 2857 may be converted into gas to separate the organic solvent and be reused. For example, the collection tank 2857 may be installed downstream of the discharge pipe 2851 than the pressure reducing valve 2855 and the pressure adjusting member 2856.

Figure 8:
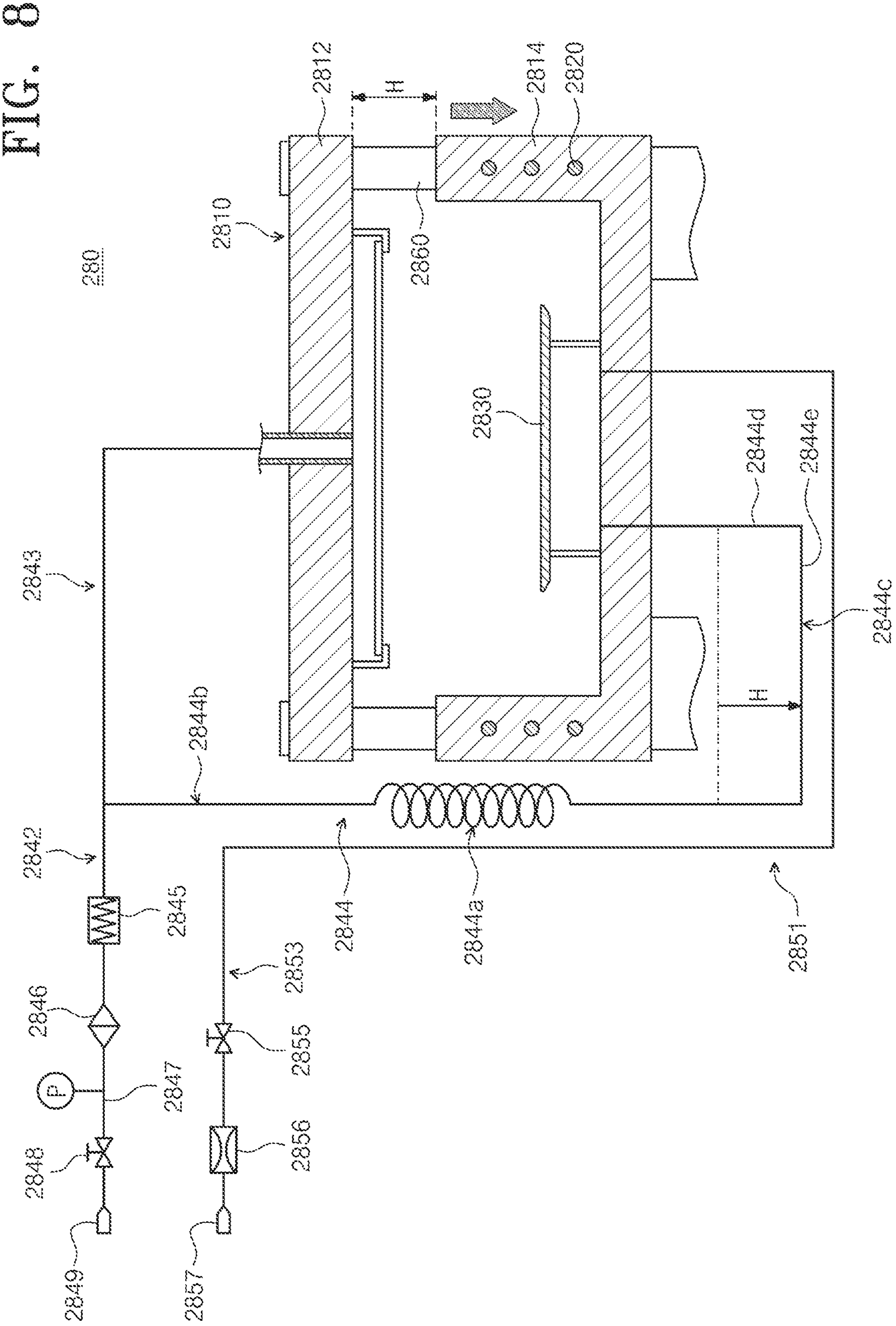
FIG. 8 is diagram schematically illustrating the drying chamber in the case where the second body of FIG. 7 moves down.

FIG. 8 is diagram schematically illustrating the drying chamber in the case where the second body of FIG. 7 moves down. Hereinafter, the supply pipe according to the exemplary embodiment will be described in detail with reference to FIG. 8.

The drying chamber 280 may remove the treatment liquid remaining on the substrate W by using a fluid for drying in a supercritical state. For example, the drying chamber 280 may perform a drying process of removing the organic solvent remaining on the substrate W by using carbon dioxide ($CO_2$) in a supercritical state. The supercritical drying process includes a substrate loading process S100 of loading the substrate W into the treatment space, a pressurizing process S200 of pressurizing the atmosphere in the treatment space, a decompressing process S300 of returning the atmosphere in the treatment space to normal pressure, and a substrate unloading process S400 of unloading the substrate W from the treatment space.

In the substrate loading process S100, the second body 2814 moves up and down toward the first body 2814 by the actuator 2860 in order to load the substrate W into the treatment space. In the substrate unloading process S400, the second body 2814 moves down in a direction away from the first body 2812 by the actuator 2860 in order to unload the substrate W from the treatment space.

Referring to FIG. 8, after the drying process is completed by the treatment fluid in the treatment space, the second body 2814 is moved downward by the actuator 2860. As an example, it is assumed that the distance that the second body 2814 moves in the downward direction is H based on the sealed state of the first body 2812 and the second body 2814. Since the first supply pipe 2844*b* connected upstream of the coil pipe 2844*a* is connected to the main supply pipe 2842 or the upper supply pipe 2843, the height of the first supply pipe 2844*b* is fixed when the second body 2814 moves up and down. As the first supply pipe 2844*b* acts as a fixing part, when the second body 2814 moves downward, the coil pipe 2844*a* may be stretched and contracted. When the second body 2814 moves downward, the coil pipe 2844*a* may be compressed. As the coil pipe 2844*a* expands and contracts by the displacement H, when the second body 2814 moves downward, the second discharge pipe 2844*c* moves downward by the movement distance H of the second body 2814 together. When the second body 2814 moves in the downward direction, the sixth portion 2844*e* may move downward by the distance H.

When supercritical drying treatment is performed on the substrate, the lower supply pipe 2844 through which the supercritical fluid flows may also be moved according to the movement of the second body 2814. Accordingly, when the second body 2814 moves, it is possible to minimize the technical disadvantage that the pipe cannot be moved, so that the pipe is damaged or plastic deformation occurs in the pipe. When the supercritical drying treatment is performed on the substrate, it is possible to minimize the pipe impact applied to the lower supply pipe 2844 through which the supercritical fluid flows. It is possible to minimize damage to various equipment installed in the lower supply pipe 2844. It is possible to prevent the supercritical fluid from leaking out of the pipe and contamination of the facility due to pipe damage.

In the above-described exemplary embodiment, the case where when the second body 2814 moves downward by the distance H, the coil pipe 2844*a* expands and contracts by the displacement H, and the sixth portion 2844*e* is moved in the downward direction by the distance H has been described, but this has been described as an example to describe the present exemplary embodiment. According to the distance H moved by the second body 2814, the coil pipe 2844*a* and the sixth portion 2844*e* may move downward with a value approximate to the displacement H.

In the above-described exemplary embodiment, it has been described as an example that the stretchable pipe 2844*a* is provided between the first supply pipe 2844*b* and the second supply pipe 2844*c*. However, the present invention is not limited thereto, and the sixth portion 2844*e* may also be provided as a pipe that can be stretched according to the vertical movement of the second body 2814. For example, the sixth portion 2844*e* may be provided as a flexible pipe. Accordingly, the pipe impact applied to the sixth portion 2844*e,* which is easily damaged by the vertical movement of the second body 2814, may be alleviated.

Figure 9:
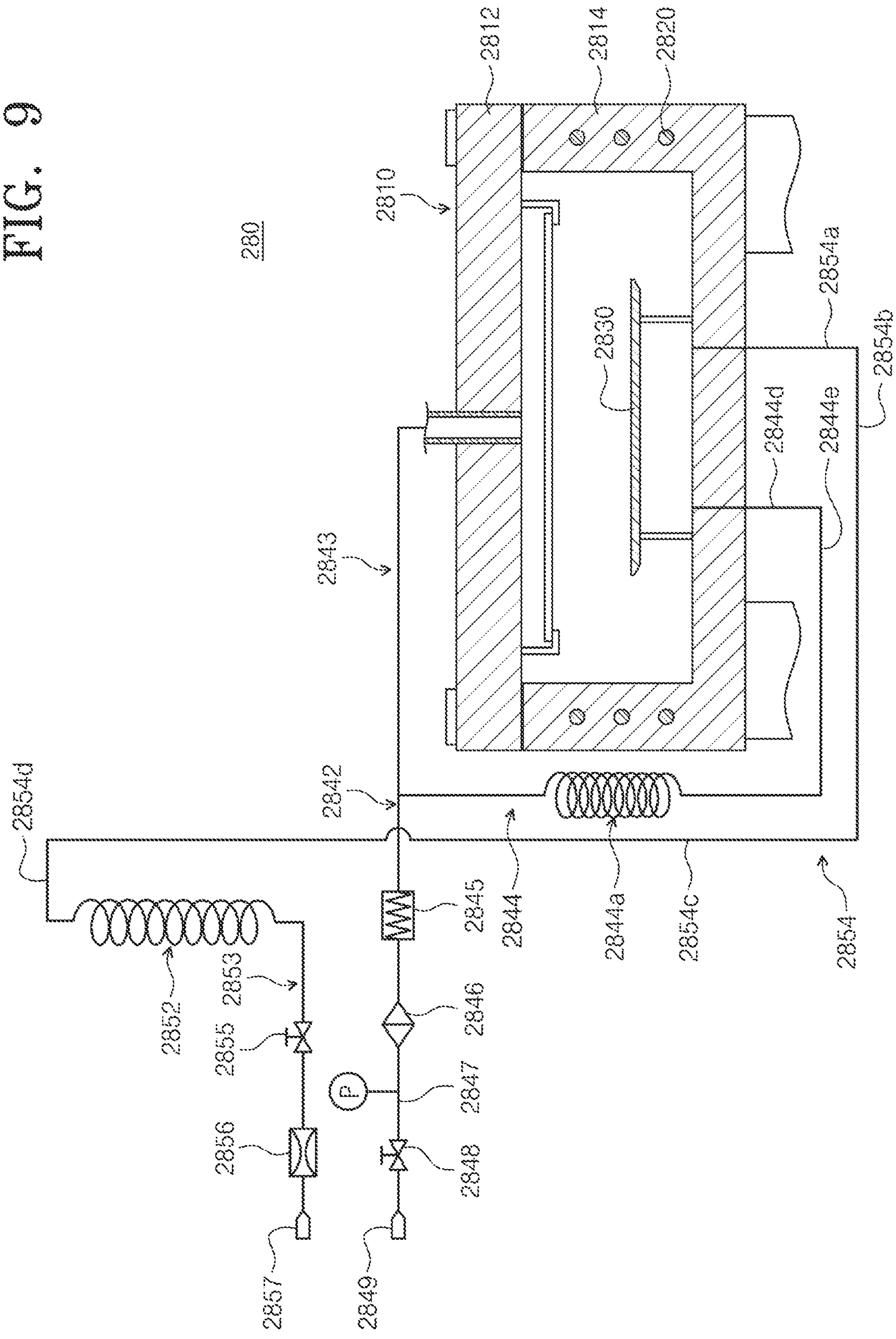
FIG. 9 is diagram schematically illustrating another exemplary embodiment of the drying chamber of FIG. 5.

FIG. 9 is diagram schematically illustrating another exemplary embodiment of the drying chamber of FIG. 5. The drying chamber 280 may include a housing 2810, a heating member 2820, a support member 2830, a fluid supplying unit 2840, a fluid discharge unit 2850, and an actuator 2860. In the present exemplary embodiment, the housing 2810, the heating member 2820, the support member 2830, and the actuator 2860 included in the drying chamber 280 of FIG. 5 are similarly provided. Accordingly, descriptions of the housing 2810, the heating member 2820, the support member 2830, and the actuator 2860 of the drying chamber 280 will be omitted below.

Referring to FIG. 9, the fluid supply unit 2840 may supply a treatment fluid to a treatment space. The treatment fluid supplied by the fluid supply unit 2840 may include carbon dioxide. The treatment fluid supplied by the fluid supply unit 2840 may be supplied to the treatment space in a supercritical state or may be converted into a supercritical state in the treatment space. The fluid supply unit 2840 may include a supply pipe 2841, a heater 2845, a filter 2846, a pressure sensor 2847, a valve 2848, and a fluid supply source 2849.

The supply pipe 2841 may supply a treatment fluid to the treatment space. The supply pipe 2841 may be connected to the housing 2810. The supply pipe 2841 may include a main supply pipe 2842, an upper supply pipe 2843, and a lower supply pipe 2844. The main supply pipe 2842 may be connected to a fluid supply source 2849 which is to be described later. The upper supply pipe 2843 may be branched from the main supply pipe 2842 and may be connected to the first body 2812. Accordingly, the upper supply pipe 2843 may supply the treatment fluid to the upper region of the treatment space. The lower supply pipe 2844 may be branched from the main supply pipe 2842 and may be connected to the second body 2814. Accordingly, the lower supply pipe 2844 may supply the treatment fluid to the lower region of the treatment space.

In the above-described example, the case where the main supply pipe 2842 is connected to the fluid supply source 2849 has been described as an example, but is not limited thereto. For example, a plurality of fluid supply sources 2849 is provided, the upper supply pipe 2843 may be connected to any one of the plurality of fluid supply sources 2849, and the lower supply pipe 2844 may be connected with another one of the plurality of fluid supply sources 2849.

The lower supply pipe 2844 may include a stretchable pipe 2844*a,* a first supply pipe 2844*b,* and a second supply pipe 2844*c*. Hereinafter, the upstream and the downstream are defined based on a direction in which the treatment fluid flows within the lower discharge pipe 2844. Specifically, in the lower supply pipe 2844, the treatment fluid flows from the fluid supply source 2849 toward the housing 2810, so a point that is relatively close to a point connected to the fluid supply source 2849 in the lower supply pipe 2844 is defined as upstream, and a point relatively close to a point connected to the second body 2814 within the lower supply pipe 2844 is defined as downstream.

The stretchable pipe 2844*a* may be stretched and contracted according to the vertical movement of the housing 2810. The stretchable pipe 2844*a* may be stretched and contracted according to the vertical movement of the second body 2814. The stretchable pipe 5844*a* may be provided as a coil-tube. Optionally, the stretchable pipe 2855*a* may be provided as a flexible pipe. The upper end of the stretchable pipe 2844*a* may be located upstream of the lower supply pipe 2844 than the lower end of the stretchable pipe 2844*a.* That is, the expansion and contraction pipe 2844*a* may be located at a point where the height relative to the ground decreases from the upstream side to the downstream side. Hereinafter, a case in which the stretchable pipe 2844*a* is provided as a coil pipe will be described as an example.

A cross-sectional area of a flow passage of the coil pipe 2844*a* through which the treatment fluid flows may be provided to be smaller than cross-sectional areas of flow passages of the first supply pipe 2844*b* and the second supply pipe 2844*c* through which the treatment fluid flows. This is because, when the cross-sectional area of the passage of the coil pipe 2844*a* is formed to be large, the magnitude of the compressive force and/or tensile force required for expansion and contraction increases. Accordingly, by providing the small cross-sectional area of the flow passage through which the treatment fluid flows in the coil pipe 2844*a,* the coil pipe 2844*a* may be easily tensioned and/or compressed according to the vertical movement of the second body 2814.

The first supply pipe 2844*b* may be connected to the upstream side of the coil pipe 2844*a.* One end of the first supply pipe 2844*b* may be connected to an upper end of the coil pipe 2844*a,* and the other end of the first supply pipe 2844*b* may be connected to the upper supply pipe 2843. Optionally, one end of the first supply pipe 2844*b* may be connected to an upper end of the coil pipe 2844*a,* and the other end of the first supply pipe 2844*b* may be connected to the main supply pipe 2842.

The second supply pipe 2844*c* may connect the coil pipe 2844*a* and the second body 2814 to each other. The second supply pipe 2844*c* may be connected to the downstream side of the coil pipe 2844*a.* One end of the second supply pipe 2844*c* may be connected to the lower end of the coil pipe 2844*a* and extend toward the downstream of the lower supply pipe 2844 to be connected to the second body 2814.

The second supply pipe 2844*c* may be provided as a fifth portion 2844*d* and a sixth portion 2844*e.* The fifth portion 2844*d* and the sixth portion 2844*e* may be sequentially disposed from the downstream to the upstream of the lower supply pipe 2844. One end of the fifth portion 2844*d* may be connected to the second body 2814. The longitudinal direction of the fifth portion 2844*d* may extend downward with respect to the ground from one end to the other end. One end of the sixth portion 2844*e* may be connected to the other end of the fifth portion 2844*d*. The longitudinal direction of the sixth portion 2844*e* may extend downward with respect to the ground from one end to the other end. The shape of the second supply pipe 2844*c* is not limited thereto, and may be provided by being modified into various shapes.

The heater 2845 may be installed in the supply pipe 2841. The heater 2845 may be installed upstream of the supply pipe 2841. The heater 2845 may be installed in the main supply pipe 2842. The heater 2845 may heat the supply pipe 2841 to control the temperature of the treatment fluid flowing (or remaining) in the supply pipe 2841.

The filter 2846 may filter the treatment fluid delivered to the treatment space from the fluid supply source 2849 which is to be described below. For example, filter 2846 may filter impurities that may be included in the treatment fluid delivered to the treatment space. The filter 2846 may be installed in the supply pipe 2841. The filter 2846 may be installed upstream of the supply pipe 2841. For example, the filter 2846 may be installed in the main supply pipe 2842.

The pressure sensor 2847 may measure the pressure in the treatment space and/or the supply pipe 2841. The pressure sensor 2847 may be installed in the supply pipe 2841. The pressure sensor 2847 may be installed upstream of the supply pipe 2841. For example, the pressure sensor 2847 may be installed in the main supply pipe 2842.

The valve 2848 may be installed in the supply pipe 2841. The valve 2848 may be installed in the upstream of the supply pipe 2841. The valve 2848 may be installed in the main supply pipe 2842. The valve 2848 may be a flow control valve. Optionally, the valve 2848 may be an on/off valve. Whether to supply the treatment fluid to the treatment space may be determined based on the opening and closing of the valve 2848.

A fluid supply source 2849 may store and/or supply the treatment fluid. The fluid supply source 2849 may be a reservoir. The fluid supply source 2849 may deliver the treatment fluid to the supply piping 2841.

The fluid discharge unit 2850 may discharge the treatment fluid from the treatment space of the housing 2810. The fluid discharge unit 2850 may include a discharge pipe 2851, a pressure reducing valve 2855, a pressure control member 2856, and a collection tank 2857.

The discharge pipe 2851 may discharge the treatment fluid from the treatment space. The discharge pipe 2851 may discharge the treatment fluid supplied to the treatment space to the outside of the housing 2810. The discharge pipe 2851 may be connected with the housing 2810. The discharge pipe 2851 may be connected to the second body 2814.

The discharge pipe 2851 may include a stretchable pipe 2852, a first discharge pipe 2853, and a second discharge pipe 2854. Hereinafter, the upstream and the downstream are defined based on a direction in which the treatment fluid flows within the discharge pipe 2851. Specifically, since the treatment fluid flows from the housing 2810 within the discharge pipe 2851, a point relatively close to the point connected to the second body 2814 within the discharge pipe 2851 is defined as upstream, and a point away from the second body 2814 within the discharge pipe 2851 in the direction in which the treatment fluid flows is defined as downstream.

The stretchable pipe 2852 may be stretched and contracted according to the vertical movement of the housing 2810. The stretchable pipe 2852 may be stretched and contracted according to the vertical movement of the second body 2814. The stretchable pipe 2852 may be provided as a coil-tube. Optionally, the stretchable pipe 2852 may be provided as a flexible pipe. An upper end of the stretchable pipe 2852 may be located upstream of the discharge pipe 2851 than a lower end of the stretchable pipe 2852. That is, the stretchable pipe 2852 may be located at a point where the relative height with respect to the ground increases from the downstream side to the upstream side. Hereinafter, the case in which the stretchable pipe 2852 is provided as a coil pipe will be described as an example.

In the coil pipe 2852, a cross-sectional area of a flow passage through which the treatment fluid flows may be provided to be smaller than cross-sectional areas of flow passages of the first discharge pipe 2853 and the second discharge pipe 2854 through which the treatment fluid flows. This is because, when the cross-sectional area of the passage of the coil pipe 2852 is formed to be large, the magnitude of the compressive force and/or tensile force required for expansion and contraction increases. Accordingly, by providing the small cross-sectional area of the flow passage through which the treatment fluid flows in the coil pipe 2852, the coil pipe 2852 may be easily tensioned and/or compressed according to the vertical movement of the second body 2814.

The first discharge pipe 2853 may be connected to the downstream side of the coil pipe 2852. One end of the first discharge pipe 2853 may be connected to the lower end of the coil pipe 2852 and extend toward the downstream of the discharge pipe 2851. The pressure reducing valve 2855, the pressure adjusting member 2856, and the collection tank 2857, which will be described later, may be installed in the first discharge pipe 2853.

The second discharge pipe 2854 may connect the coil pipe 2852 and the second body 2814 to each other. The second discharge pipe 2854 may be connected to the upstream side of the coil pipe 2852. One end of the second discharge pipe 2854 may be connected to the upper end of the coil pipe 2852 and extend toward the upstream of the discharge pipe 2851 to be connected to the second body 2814.

The second discharge pipe 2854 may be provided as a first portion 2854*a*, a second portion 2854*b*, a third portion 2854*c*, and a fourth portion 2854*d*. The first portion 2854*a*, the second portion 2854*b*, the third portion 2854*c*, and the fourth portion 2854*d* may be sequentially disposed from the upstream to the downstream of the discharge pipe 2851. One end of the first portion 2854*a* may be connected to the second body 2814. A longitudinal direction of the first portion 2854*a* may extend downward with respect to the ground from one end to the other end. One end of the second portion 2854*b* may be connected to the other end of the first portion 2854*a*. The longitudinal direction of the second portion 2854*b* may extend in a direction parallel to the ground from one end to the other end. One end of the third portion 2854*c* may be connected to the other end of the second portion 2854*b*. The lengthwise direction of the third portion 2854*c* may extend vertically from one end to the other end in an upward direction with respect to the ground. One end of the fourth portion 2854*d* may be connected to the other end of the third portion 2854*c*. The longitudinal direction of the fourth portion 2854*d* may extend horizontally from one end to the other end with respect to the ground. The other end of the fourth portion 2854*d* may be connected to the upper end of the coil pipe 2852. The second discharge pipe 2854 is not limited thereto, and may be provided while being transformed into various shapes.

The pressure reducing valve 2855 may allow the treatment fluid to be selectively discharged from the treatment space. The pressure reducing valve 2855 may selectively allow the treatment fluid to flow to the discharge piping 2851. The pressure reducing valve 2855 may be an on/off valve. The pressure reducing valve 2855 may be installed in the first discharge pipe 2853.

The pressure adjusting member 2856 may constantly maintain a pressure in the treatment space at a set pressure. For example, the pressure adjusting member 2856 may measure the pressure of the treatment fluid flowing in the discharge pipe 2851. Also, the pressure adjusting member 2856 may measure the pressure of the treatment space based on the pressure of the treatment fluid flowing in the discharge pipe 2851. Also, the pressure adjusting member 2856 may adjust the discharge flow rate per unit time of the treatment fluid discharged through the discharge pipe 2851 so as to maintain the pressure of the treatment space at the set pressure. For example, the pressure adjusting member 2856 may be a Back Pressure Regulator (BPR). The pressure adjusting member 2856 may be installed in the first discharge pipe 2853.

The collection tank 2857 may provide a space to store the treatment fluid discharged from the treatment space. The treatment fluid used in the supercritical drying process stored in the collection tank 2857 may be converted into gas to separate the organic solvent and be reused. The collection tank 2857 may be installed in the first discharge pipe 2853. As an example, the collection tank 2857 may be installed downstream of the first discharge pipe 2853 than the pressure reducing valve 2855 and the pressure adjusting member 2856.

Figure 10:
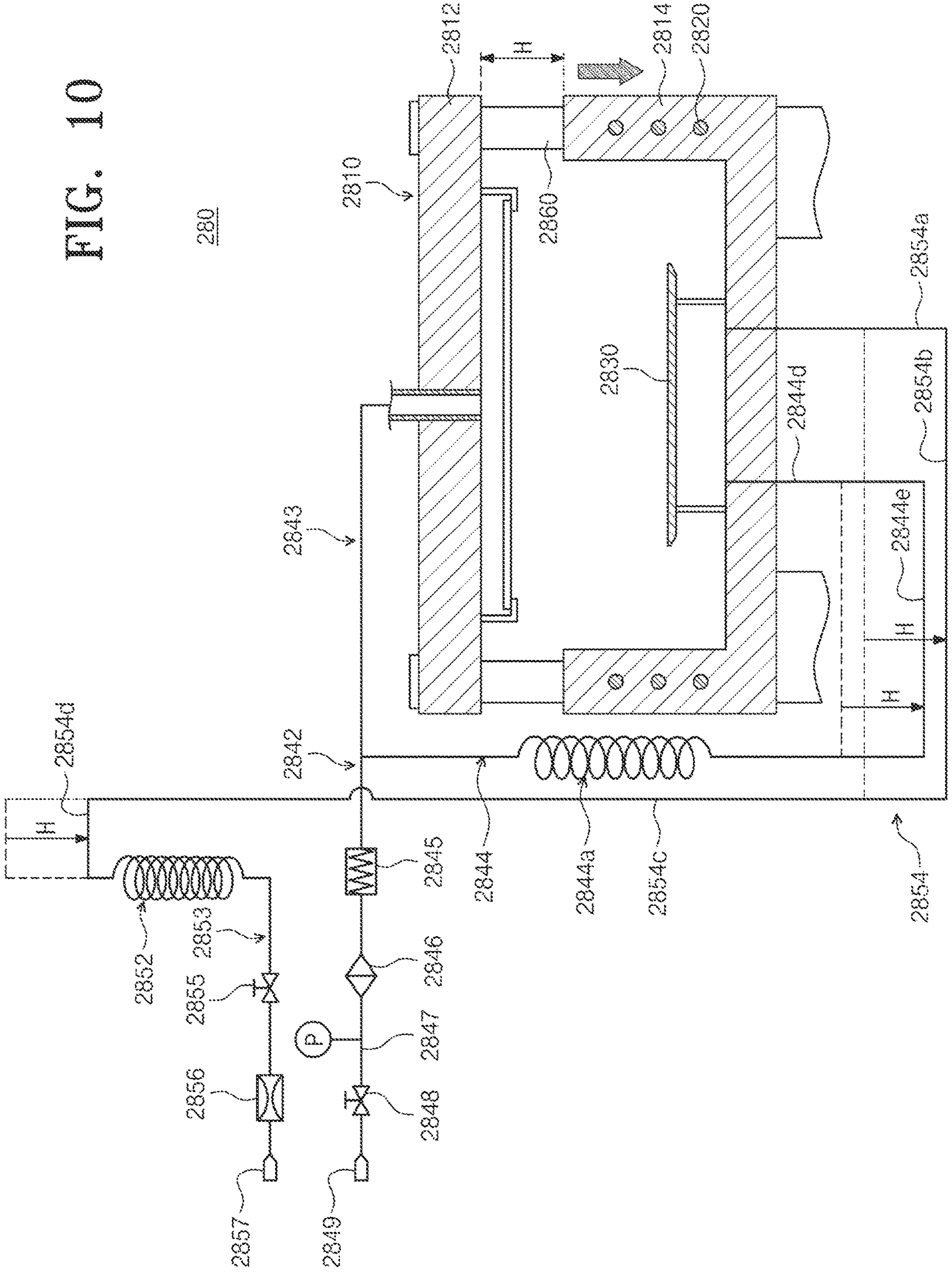
FIG. 10 is a diagram schematically illustrating the drying chamber in the case where the second body of FIG. 9 moves down.

FIG. 10 is a diagram schematically illustrating the drying chamber in the case where the second body of FIG. 9 moves down. Referring to FIG. 10, after the drying process is completed by the treatment fluid in the treatment space, the second body 2814 is moved downward by the actuator 2860. As an example, it is assumed that the distance that the second body 2814 moves in the downward direction is H based on the sealed state of the first body 2812 and the second body 2814.

Since the first supply pipe 2844*b* connected upstream of the coil pipe 2844*a* installed in the lower supply pipe 2844 is connected to the main supply pipe 2842 or the upper supply pipe 2843, the height of the first supply pipe 2844*b* is fixed when the second body 2814 moves up and down. As the first supply pipe 2844*b* acts as a fixing part, when the second body 2814 moves downward, the coil pipe 2844*a* installed in the lower supply pipe 2844 may be stretched and contracted. When the second body 2814 moves downward, the coil pipe 2844*a* installed in the lower supply pipe 2844 may be compressed. As the coil pipe 2844*a* installed in the lower supply pipe 2844 expands and contracts by the displacement H, when the second body 2814 moves downward, the second supply pipe 2844*c* moves downward by the movement distance H of the second body 2814 together. When the second body 2814 moves in the downward direction, the sixth portion 2844*e* may move downward by the distance H. The pressure reducing valve 2855, the pressure adjusting member 2856, the collection tank 2857, and the like are installed in the first discharge pipe 2853 connected downstream of the coil pipe 2852 installed in the discharge pipe 2851, so that when the second body 2814 moves up and down, the first discharge pipe 2853 is provided so that the height thereof is fixed. As the first discharge pipe 2853 acts as a fixing part, when the second body 2814 moves downward, the coil pipe 2852 installed in the discharge pipe 2851 may be stretched and contracted. When the second body 2814 moves downward, the coil pipe 2852 installed in the discharge pipe 2851 may be compressed. As the coil pipe 2852 installed in the discharge pipe 2851 expands and contracts by the displacement H, when the second body 2814 moves downward, the second discharge pipe 2854 moves downward by the movement distance H of the second body 2814 together. When the second body 2814 moves downward, the first portion 2854*a* and the third portion 2854*c* may move downward by the distance H.

When the supercritical drying treatment is performed on the substrate, the lower supply pipe 2844 and the discharge pipe 2851 through which the supercritical fluid flows may also be moved along with the movement of the second body 2814. Accordingly, when the second body 2814 moves, it is possible to minimize the technical disadvantage that the pipe cannot be moved, so that the pipe is damaged or plastic deformation occurs in the pipe. When the supercritical drying treatment is performed on the substrate, it is possible to minimize the pipe impact applied to the lower supply pipi 2844 and the discharge pipe 2851 through which the supercritical fluid flows. Damage to various equipment installed in the lower supply pipi 2844 and the discharge pipe 2851 may be minimized It is possible to prevent the supercritical fluid from leaking out of the pipe and contamination of the facility due to pipe damage.

The upper end of the coil pipe 2852 installed in the discharge pipe 2851 is positioned upstream of the discharge pipe 2851 than the lower end of the coil pipe 2852 installed in the discharge pipe 2851 to prevent backflow due to condensation of the treatment fluid flowing in the discharge pipe 2851. Therefore, it is possible to prevent back contamination into the treatment space due to the backflow of the treatment fluid in the discharge pipe 2851.

The foregoing detailed description illustrates the present invention. Further, the above content shows and describes the exemplary embodiment of the present invention, and the present invention can be used in various other combinations, modifications, and environments. That is, changes or modifications are possible within the scope of the concept of the invention disclosed herein, the scope equivalent to the written disclosure, and/or within the scope of skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. Further, the accompanying claims should be construed to include other exemplary embodiments as well.

What is claimed is:

1. A substrate treating apparatus, comprising:

a housing including a first body and a second body which are combined with each other to provide a treatment space in which a substrate is treated;

an actuator which moves the second body in a vertical direction with respect to the first body to seal or open the treatment space; and a pipe which is coupled with the second body and in which a fluid flows, wherein the pipe includes a stretchable pipe that is stretchable and contractible according to the vertical movement of the second body, wherein the stretchable pipe is a coil pipe and is configured to maintain structural and sealing integrity during thermal and pressure cycling in a supercritical state, and wherein the pipe includes a pressure reducing valve configured to selectively discharge the fluid from the treatment space, and a pressure adjusting valve configured to regulate a discharge flow rate to maintain a set pressure in the treatment space during expansion and contraction of the coil pipe caused by vertical movement of the second body, and wherein the pipe includes a discharge pipe configured to discharge the fluid from the treatment space, and the coil pipe is located at the discharge pipe, and wherein an upper end of the coil pipe is located upstream of the discharge pipe than the lower end of the coil pipe.

2. The substrate treating apparatus of claim 1, wherein;

the pipe further includes a supply pipe supplying the fluid to the treatment space, the coil pipe is also located at the supply pipe, the coil pipe is located at the discharge pipe is a first coil pipe and the coil pipe located at the supply pipe is a second coil pipe, an upper end of the second coil pipe is located upstream of the supply pipe than a lower end of the second coil pipe, the first coil pipe is provided to be compressed when the second body moves in a downward direction, and the second coil pipe is provided to be tensioned when the second body moves in a downward direction.

3. The substrate treating apparatus of claim 2, wherein the discharge pipe further includes:

a first discharge pipe connected to a downstream side of the coil pipe; and a second discharge pipe which connects the coil pipe and the second body is at the upstream side of the coil pipe, and a height of the first discharge pipe is fixed when the second body vertically moves, and wherein the second discharge pipe is provided to be vertically moved along with the vertical movement of the second body when the second body vertically moves.

4. The substrate treating apparatus of claim 2, wherein the supply pipe further includes:

a first supply pipe connected to an upstream side of the coil pipe; and a second supply pipe which connects the coil pipe and the second body is at a downstream side of the coil pipe, and a height of the first supply pipe is fixed when the second body vertically moves, and wherein the second supply pipe is provided to be vertically moved along with the vertical movement of the second body when the second body vertically moves.

5. The substrate treating apparatus of claim 1, wherein a cross-sectional area of a passage through which the fluid for drying in the supercritical state flows in the coil pipe is formed to be smaller than a cross-sectional area of a pipe connected to an upper end of the coil pipe and a lower end of the coil pipe.

6. The substrate treating apparatus of claim 1, wherein the second body is located below the first body, and the pipe includes:

a first supply pipe connected to the first body to supply the fluid to the treatment space;

a second supply pipe connected to the second body to supply the fluid to the treatment space; and a discharge pipe which discharges the fluid to the treatment space, and wherein the coil pipe is connected to each of the second supply pipe and the discharge pipe.

7. A substrate treating apparatus, comprising:

a housing provided with a first body and a second body which are combined with each other to form a treatment space in which an organic solvent remaining on a substrate is dried by a fluid for drying in a supercritical state;

an actuator configured to move up and down the second body with respect to the first body to seal or open the treatment space;

a support unit configured to support the substrate within the treatment space;

a discharge pipe coupled to the second body to discharge the fluid for drying in the supercritical state from the treatment space, wherein the discharge pipe includes a coil pipe that is stretchable and contractible according to the up and down movement of the second body; and an upper end of the coil pipe is located upstream of the discharge pipe than a lower end of the coil pipe when the second body moves up and seals the treatment space, wherein the coil pipe is configured to maintain structural and sealing integrity during thermal and pressure cycling in the supercritical state, and wherein the discharge pipe includes a pressure reducing valve configured to selectively discharge the fluid from the treatment space, and pressure adjusting valve configured regulate a discharge flow rate to maintain a set pressure in the treatment space during expansion and contraction of the coil pipe caused by vertical movement of the second body, and wherein the pipe includes a discharge pipe configured to discharge the fluid from the treatment space, and the coil pipe is located at the discharge pipe, and wherein an upper end of the coil pipe is located upstream of the discharge pipe than the lower end of the coil pipe.

8. The substrate treating apparatus of claim 7, wherein the apparatus further includes:

a supply pipe coupled to the second body to supply the fluid for drying in the supercritical state to the treatment space, wherein:

the coil pipe is also located at the supply pipe, the coil pipe located at the discharge pipe is a first coil pipe and the coil pipe located at the supply pipe is a second coil pipe, the first coil pipe is provided to be compressed when the second body moves down, and the second coil pipe is provided to be tensioned when the second body moves in a downward direction.

9. The substrate treating apparatus of claim 8, wherein the discharge pipe further includes:

a first discharge pipe connected to a downstream side of the coil pipe; and a second discharge pipe which connects the coil pipe and the second body at the upstream side of the coil pipe, and a height of the first discharge pipe is fixed when the second body vertically moves, and the second discharge pipe is provided to be vertically moved along with the vertical movement of the second body when the second body vertically moves.

10. The substrate treating apparatus of claim 9, wherein the second discharge pipe includes a first portion, a second portion, a third portion, and a fourth portion sequentially disposed from an upstream side to a downstream side of the discharge pipe, and the first portion is extended in a downward direction with respect to the ground from a point coupled to the second body, the second portion is extended in a direction parallel to the ground from the first portion, the third portion is extended vertically upward with respect to the ground from the second portion, and the fourth portion is extended horizontally with respect to the ground from the third portion, and when the second body moves down, the first portion and the third portion move in a downward direction and the coil pipe is compressed.

11. The substrate treating apparatus of claim 7, wherein a cross-sectional area of a passage through which the fluid for drying in the supercritical state flows in the coil pipe is formed to be smaller than a cross-sectional area of a pipe connected to an upper end of the coil pipe and a lower end of the coil pipe.

12. A substrate treating apparatus, comprising:

a housing provided with a first body and a second body which are combined with each other to form a treatment space in which an organic solvent remaining on a substrate is dried by a fluid for drying in a supercritical state;

an actuator configured to move up and down the second body with respect to the first body to seal or open the treatment space;

a support unit configured to support the substrate within the treatment space;

a supply pipe coupled to the second body to supply the fluid for drying in the supercritical state to the treatment space, wherein the supply pipe includes a coil pipe that is stretchable and contractible according to the up and down movement of the second body; and an upper end of the coil pipe is located upstream of the supply pipe than a lower end of the coil pipe when the second body moves up to seal the treatment space, wherein the coil pipe is configured to maintain structural and sealing integrity during thermal and pressure cycling in the supercritical state, and wherein the supply pipe includes a pressure reducing valve configured to selectively discharge the fluid from the treatment space, and pressure adjusting member configured to regulate a discharge flow rate to maintain a set pressure in the treatment space during expansion and contraction of the coil pipe caused by vertical movement of the second body.

13. The substrate treating apparatus of claim 12, wherein the supply pipe further includes:

a first supply pipe connected to an upstream side of the coil pipe; and a second supply pipe which connects the coil pipe and the second body at a downstream side of the coil pipe, and a height of the first supply pipe is fixed when the second body vertically moves, and the second supply pipe is provided to be vertically moved along with the vertical movement of the second body when the second body vertically moves.

14. The substrate treating apparatus of claim 13, wherein the second supply pipe includes a fifth portion and a sixth portion which are sequentially disposed from the coil pipe to a downstream side of the supply pipe, and the fifth portion is extended in a downward direction with respect to the ground from a point coupled to the second body, the sixth portion is extended in a direction parallel to the ground from the fifth portion, and when the second body moves down, the fifth portion moves in the downward direction and the coil pipe is tensioned.

15. The substrate treating apparatus of claims 12, wherein a cross-sectional area of a passage through which the fluid for drying in the supercritical state flows in the coil pipe is formed to be smaller than a cross-sectional area of a pipe connected to an upper end of the coil pipe and a lower end of the coil pipe.

* * * * *